United States Patent
Zhang et al.

(10) Patent No.: US 12,363,577 B2
(45) Date of Patent: Jul. 15, 2025

(54) INTER-NETWORK ENTITY SUBBAND-BASED CROSS-LINK INTERFERENCE MEASUREMENT AND REPORTING

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 18/052,184

(22) Filed: Nov. 2, 2022

(65) Prior Publication Data
US 2024/0147279 A1 May 2, 2024

(51) Int. Cl.
*H04W 24/06* (2009.01)
*H04W 24/08* (2009.01)
*H04W 24/10* (2009.01)

(52) U.S. Cl.
CPC .......... *H04W 24/10* (2013.01); *H04W 24/08* (2013.01)

(58) Field of Classification Search
CPC .............................. H04W 24/10; H04W 24/08
See application file for complete search history.

(56) References Cited

U.S. PATENT DOCUMENTS

| | | | |
|---|---|---|---|
| 2024/0015546 A1* | 1/2024 | Awadin | H04W 24/10 |
| 2024/0063992 A1* | 2/2024 | Esswie | H04W 72/1273 |
| 2024/0064539 A1* | 2/2024 | Esswie | H04W 24/10 |

OTHER PUBLICATIONS

International Search Report and Written Opinion—PCT/US2023/074689—ISA/EPO—Jan. 23, 2024 (2207392WO).
Moderator (Catt): "Summary #4 of Subband Non-overlapping Full Duplex", 3GPP TSG RAN WG1 #110bis-e, R1-2210317, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Oct. 20, 2022, 184 Pages, XP052259785, p. 122, line 14-p. 123, line 10.

(Continued)

*Primary Examiner* — Zhiren Qin
(74) *Attorney, Agent, or Firm* — Holland & Hart LLP

(57) ABSTRACT

Methods, systems, and devices for wireless communications are described. In some aspects, a first network entity may support one or more mechanisms according to which the first network entity may measure cross-link interference (CLI) from a second network entity and report one or more interference metrics associated with the measured CLI on a per-subband basis. The first network entity may receive an indication of a set of subbands, measure a set of interference metrics associated with the indicated set of subbands, and transmit a measurement report to indicate or otherwise convey information associated with at least a subset of the measured interreference metrics. The first network entity may receive the indication of the set of subbands from a centralized unit (CU), an operations, administration, and maintenance (OAM) entity, or a neighboring base station and may transmit the measurement report to the CU, the OAM, or the neighboring base station.

30 Claims, 10 Drawing Sheets

(56) References Cited

OTHER PUBLICATIONS

Qualcomm Incorporated: "Feasibility and Techniques for Subband Non-overlapping Full Duplex", 3GPP TSG RAN WG1, Meeting #110bis-e, R1-2209983, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, XP052259454, 37 Pages, Section 2.6.1, Sections 3.5, 3.3, 4, paragraph [2.6.3], p. 19, paragraph 3.5-p. 21, paragraph 3.6, p. 20, line 21-p. 21, line 23.

Qualcomm Incorporated: "Feasibility and Techniques for Subband Non-overlapping Full Duplex", 3GPP TSG RAN WG1, Meeting #111, R1-2212115, Type Discussion, 23-25 FS_NR Duplex_Evo, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 5, 2022, pp. 1-42, XP052222678, Sections 3.1, 3.1.1, 3.1.2, 3.1.3, Section 3.6.

Spreadtrum Communications: "Discussion on Subband Non-overlapping Full Duplex", 3GPP TSG RAN WG1 #110, R1-2205989, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 15 Pages, XP052273922, Section 2.4.

\* cited by examiner

INTER-NETWORK ENTITY SUBBAND-BASED CROSS-LINK INTERFERENCE MEASUREMENT AND REPORTING

TECHNICAL FIELD

The following relates to wireless communications, including inter-network entity subband-based cross-link interference (CLI) measurement and reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, some devices may support full-duplex or dynamic time-division duplexing (TDD) communication. In scenarios in which such devices are relatively near each other or in which such devices use a same or similar set of subbands, one or more of the devices may experience cross-link interference (CLI) from another one or more of the devices.

SUMMARY

The described techniques relate to improved methods, systems, devices, and apparatuses that support inter-network entity subband-based cross-link interference (CLI) measurement and reporting. For example, the described techniques provide for signaling mechanisms according to which a first network entity may measure CLI from a second network entity (e.g., a neighboring base station) in one or more specific subbands or frequency resources, where such one or more specific subbands may be indicated to the first network entity via signaling. The first network entity may receive an indication of the one or more specific subbands from a centralized unit (CU), an operations, administration, and maintenance (OAM) entity, or a neighboring base station (e.g., the second network entity). The first network entity may measure CLI in the indicated subbands and may transmit a measurement report including measured interference metrics associated with at least a subset of the indicated subbands. The first network entity may transmit the measurement report to a CU, an OAM entity, or a neighboring base station (e.g., the second network entity).

A method for wireless communication at a first network entity is described. The method may include receiving an indication of a set of subbands associated with a CLI measurement at the first network entity, where the set of subbands is indicated from a set of multiple subbands configured for the first network entity, and where the CLI measurement is associated with interference between the first network entity and a second network entity, measuring a set of interference metrics associated with the set of subbands in accordance with receiving the indication of the set of subbands, where a respective interference metric of the set of interference metrics is associated with a respective subband of the set of subbands, and transmitting a measurement report associated with at least one or more interference metrics of the set of interference metrics, where the at least one or more interference metrics are associated with one or more subbands of the set of subbands.

An apparatus for wireless communication at a first network entity is described. The apparatus may include at least one processor and memory coupled (e.g., operatively, communicatively, functionally, electronically, or electrically) with the at least one processor, the memory storing instructions executable by the at least one processor. The instructions may be executable by the processor to cause the first network entity to receive an indication of a set of subbands associated with a CLI measurement at the first network entity, where the set of subbands is indicated from a set of multiple subbands configured for the first network entity, and where the CLI measurement is associated with interference between the first network entity and a second network entity, measure a set of interference metrics associated with the set of subbands in accordance with receiving the indication of the set of subbands, where a respective interference metric of the set of interference metrics is associated with a respective subband of the set of subbands, and transmit a measurement report associated with at least one or more interference metrics of the set of interference metrics, where the at least one or more interference metrics are associated with one or more subbands of the set of subbands.

Another apparatus for wireless communication at a first network entity is described. The apparatus may include means for receiving an indication of a set of subbands associated with a CLI measurement at the first network entity, where the set of subbands is indicated from a set of multiple subbands configured for the first network entity, and where the CLI measurement is associated with interference between the first network entity and a second network entity, means for measuring a set of interference metrics associated with the set of subbands in accordance with receiving the indication of the set of subbands, where a respective interference metric of the set of interference metrics is associated with a respective subband of the set of subbands, and means for transmitting a measurement report associated with at least one or more interference metrics of the set of interference metrics, where the at least one or more interference metrics are associated with one or more subbands of the set of subbands.

A non-transitory computer-readable medium storing code for wireless communication at a first network entity is described. The code may include instructions executable by at least one processor to receive an indication of a set of subbands associated with a CLI measurement at the first network entity, where the set of subbands is indicated from a set of multiple subbands configured for the first network entity, and where the CLI measurement is associated with interference between the first network entity and a second network entity, measure a set of interference metrics associated with the set of subbands in accordance with receiving the indication of the set of subbands, where a respective interference metric of the set of interference metrics is associated with a respective subband of the set of subbands, and transmit a measurement report associated with at least one or more interference metrics of the set of interference metrics, where the at least one or more interference metrics are associated with one or more subbands of the set of subbands.

Some examples of the method, apparatuses, and non-transitory computer-readable medium described herein may further include operations, features, means, or instructions for receiving information associated with a subband configuration, where the subband configuration may be associated with a guard band between an uplink subband and a downlink subband, and where a size of the guard band may be based on the measurement report and communicating with a UE in accordance with the subband configuration for network-side subband full-duplex operation.

In some examples of the method, apparatuses, and non-transitory computer-readable medium described herein, receiving the indication of the set of subbands associated with the CLI measurement may include operations, features, means, or instructions for receiving information associated with a respective set of resource blocks associated with each subband of the set of subbands, where the information includes one or more of a respective starting resource block index, a respective quantity of resource blocks, and a respective ending resource block index for each subband of the set of subbands.

In some examples of the method, apparatuses, and non-transitory computer-readable medium described herein, receiving the indication of the set of subbands associated with the CLI measurement may include operations, features, means, or instructions for receiving an indication of a bitmap associated with the set of multiple subbands that may be configured for the first network entity, where the bitmap indicates the set of subbands from the set of multiple subbands, and where the measurement report includes each of the set of interference metrics associated with the set of subbands in accordance with the set of subbands being indicated by the bitmap.

Some examples of the method, apparatuses, and non-transitory computer-readable medium described herein may further include operations, features, means, or instructions for including the at least one or more interference metrics in the measurement report in accordance with an interference metric threshold and including one or more subband identifiers associated with the one or more subbands in the measurement report. Some examples of the method, apparatuses, and non-transitory computer-readable medium described herein may further include operations, features, means, or instructions for receiving an indication of the interference metric threshold.

A method for wireless communication is described. The method may include transmitting, to a first network entity from a second network entity, an indication of a set of subbands associated with a CLI measurement at the first network entity, where the set of subbands is indicated from a set of multiple subbands configured for the first network entity, and where the CLI measurement is associated with interference between the first network entity and the second network entity, transmitting a set of one or more reference signals via the set of subbands in accordance with transmitting the indication of the set of subbands, and receiving, at the second network entity from the first network entity, a measurement report associated with at least one or more interference metrics of a set of interference metrics, where the at least one or more interference metrics are associated with one or more subbands of the set of subbands.

An apparatus for wireless communication is described. The apparatus may include at least one processor and memory coupled (e.g., operatively, communicatively, functionally, electronically, or electrically) with the at least one processor, the memory storing instructions executable by the at least one processor. The instructions may be executable by the processor to cause the apparatus to transmit, to a first network entity from a second network entity, an indication of a set of subbands associated with a CLI measurement at the first network entity, where the set of subbands is indicated from a set of multiple subbands configured for the first network entity, and where the CLI measurement is associated with interference between the first network entity and the second network entity, transmit a set of one or more reference signals via the set of subbands in accordance with transmitting the indication of the set of subbands, and receive, at the second network entity from the first network entity, a measurement report associated with at least one or more interference metrics of a set of interference metrics, where the at least one or more interference metrics are associated with one or more subbands of the set of subbands.

Another apparatus for wireless communication is described. The apparatus may include means for transmitting, to a first network entity from a second network entity, an indication of a set of subbands associated with a CLI measurement at the first network entity, where the set of subbands is indicated from a set of multiple subbands configured for the first network entity, and where the CLI measurement is associated with interference between the first network entity and the second network entity, means for transmitting a set of one or more reference signals via the set of subbands in accordance with transmitting the indication of the set of subbands, and means for receiving, at the second network entity from the first network entity, a measurement report associated with at least one or more interference metrics of a set of interference metrics, where the at least one or more interference metrics are associated with one or more subbands of the set of subbands.

A non-transitory computer-readable medium storing code for wireless communication is described. The code may include instructions executable by at least one processor to transmit, to a first network entity from a second network entity, an indication of a set of subbands associated with a CLI measurement at the first network entity, where the set of subbands is indicated from a set of multiple subbands configured for the first network entity, and where the CLI measurement is associated with interference between the first network entity and the second network entity, transmit a set of one or more reference signals via the set of subbands in accordance with transmitting the indication of the set of subbands, and receive, at the second network entity from the first network entity, a measurement report associated with at least one or more interference metrics of a set of interference metrics, where the at least one or more interference metrics are associated with one or more subbands of the set of subbands.

Some examples of the method, apparatuses, and non-transitory computer-readable medium described herein may further include operations, features, means, or instructions for transmitting, from the second network entity to the first network entity, information associated with a subband configuration for network-side subband full-duplex operation, where the subband configuration may be associated with a guard band between an uplink subband and a downlink subband, and where a size of the guard band may be based on the measurement report.

In some examples of the method, apparatuses, and non-transitory computer-readable medium described herein, transmitting the indication of the set of subbands associated with the CLI measurement may include operations, features, means, or instructions for transmitting information associated with a respective set of resource blocks associated with each subband of the set of subbands, where the information includes one or more of a respective starting resource block index, a respective quantity of resource blocks, and a respective ending resource block index for each subband of the set of subbands.

In some examples of the method, apparatuses, and non-transitory computer-readable medium described herein, transmitting the indication of the set of subbands associated with the CLI measurement may include operations, features, means, or instructions for transmitting an indication of a bitmap associated with the set of multiple subbands that may be configured for the first network entity, where the bitmap indicates the set of subbands from the set of multiple subbands, and where the measurement report includes each of the set of interference metrics associated with the set of subbands in accordance with the set of subbands being indicated by the bitmap.

In some examples of the method, apparatuses, and non-transitory computer-readable medium described herein, the measurement report includes the at least one or more interference metrics in accordance with an interference metric threshold and includes one or more subband identifiers associated with the one or more subbands. Some examples of the method, apparatuses, and non-transitory computer-readable medium described herein may further include operations, features, means, or instructions for transmitting, from the second network entity to the first network entity, an indication of the interference metric threshold.

DETAILED DESCRIPTION

Figure 1:
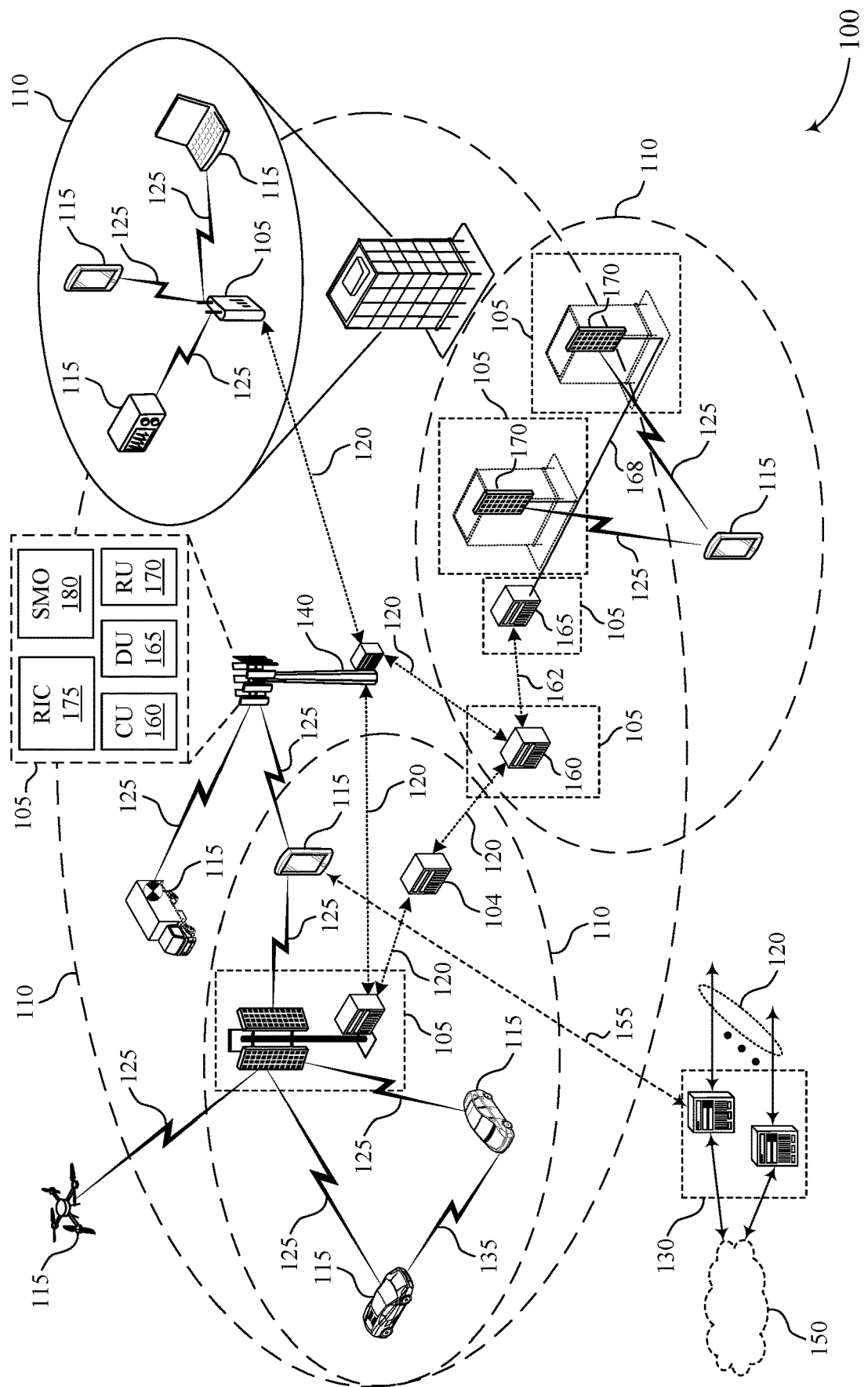
FIG. 1 illustrates an example of a wireless communications system that supports inter-network entity subband-based cross-link interference (CLI) measurement and reporting in accordance with one or more aspects of the present disclosure.

In some systems, one or more wireless communication devices may support full-duplex or flexible time-division duplexing (TDD) communication according to which such devices may simultaneously transmit and receive or may switch between uplink and downlink communication across various time intervals, respectively. In some deployments, a full-duplex or dynamic TDD capable device may support a subband configuration according to which the device may transmit via a first set of one or more subbands and receive via a second set of one or more subbands, where the first and second sets of subbands may overlap or may be non-overlapping in the frequency domain. In such deployments, nearby network entities may experience inter-gNB cross-link interference (CLI), especially in scenarios in which two nearby network entities use same or similar frequency bands for one or both of uplink communication and downlink communication. Such inter-gNB CLI may adversely impact a likelihood for successful communication at a network entity, which may negatively impact system throughput and latency. In some systems, network entities may lack an efficient signaling mechanism according to which a network entity may measure and report inter-gNB CLI in specific subbands on a per-subband basis.

In some implementations, a first network entity may support one or more signaling- or configuration-based mechanisms according to which the first network entity may measure CLI from a second network entity and report one or more interference metrics associated with the measured CLI on a per-subband basis. For example, the first network entity may receive an indication of a set of subbands (e.g., a set of one or more subbands), measure a set of interference metrics associated with the indicated set of subbands, and transmit a measurement report to indicate or otherwise convey information associated with at least a subset of the measured interreference metrics. The first network entity may receive the indication of the set of subbands in one or more of various ways, including via an indication of a respective set of resource blocks for each of the indicated subbands or via a bitmap that indicates the set of subbands from a larger set of subbands. Further, the first network entity may generate and transmit the measurement report in one or more of various ways. For example, the first network entity may include each of the measured interference metrics (and associated subband identifiers) in the measurement report or may include a subset of the measured interference metrics (and associated subband identifiers) in the measurement report. In implementations in which the first network entity includes a subset of the measured interference metrics, the first network entity may select which interference metrics to report based on how each of the measured interference metrics compare to an interference metric threshold. Further, the first network entity may indicate interference metrics via the measurement report absolutely or differentially, or in some combination thereof.

Particular implementations of the subject matter described in this disclosure can be implemented to realize one or more of the following potential advantages. For example, in accordance with supporting signaling- or configuration-based mechanisms according to which the first network entity measures and reports inter-gNB CLI on a per-subband basis, the first network entity may obtain and report more accurate CLI measurements, which may be used to make future scheduling decisions involving the first network entity and the second network entity. Further, in accordance with the described signaling mechanisms associated with indicating for which subbands the first network entity may measure CLI and indicating for which subbands the first network entity reports corresponding interference metrics, the system may obtain more accurate CLI measurements while maintaining a suitable signaling overhead. As such, the first network entity, and devices with which the first network entity communities, may experience higher data rates, greater spectral efficiency, and greater system capacity.

Further, such signaling- or configuration-based mechanisms according to which the first network entity measures and reports inter-gNB CLI on a per-subband basis may facilitate greater adoption of full-duplex or dynamic TDD operation, which may provide other benefits to adopting systems. For example, full-duplex operation may support longer uplink duty cycles, which may lead to latency reduction and greater uplink coverage. For example, in accordance with full-duplex operation, the UE may receive a downlink signal in "uplink only" slots, which may enable or otherwise facilitate latency savings. Further, full-duplex operation may increase system capacity, resource utilization, and spectrum efficiency and enable flexible and dynamic uplink or downlink resource adaptation according to uplink or downlink traffic in a robust (such as reliable) manner. For example, full-duplex operations may offer solutions to some dynamic TDD challenges. As such, the first UE, among other devices that may communicate with the first UE, may experience higher reliability, high data rates, and greater spectral efficiency as well as lower latency and lower power consumption (in accordance with performing or receiving fewer retransmissions), among other benefits.

Aspects of the disclosure are initially described in the context of wireless communications systems. Aspects of the disclosure are additionally illustrated by and described with reference to an interference measurement diagram, a signaling diagram, and a process flow. Aspects of the disclosure are further illustrated by and described with reference to apparatus diagrams, system diagrams, and flowcharts that relate to inter-network entity subband-based CLI measurement and reporting.

FIG. 1 illustrates an example of a wireless communications system 100 that supports inter-network entity subband-based CLI measurement and reporting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1. Components within a wireless communication system may be coupled (for example, operatively, communicatively, functionally, electronically, and/or electrically) to each other.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support inter-network entity subband-based CLI measurement and reporting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium.

In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz).

Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Various devices within the wireless communications system 100 may support one or more levels of duplex operation, which may depend on or be associated with a deployment scenario, a duplex mode (such as TDD only, FDD only, or both TDD and FDD), or an interference management procedure. In some aspects, a wireless device (e.g., a UE 115, a network entity 105, or an IAB node 104) within the wireless communications system 100 may support half-duplex or full-duplex operation. For example, a network entity 105 may support various types of MIMO communication, including downlink multi-user MIMO (MU-MIMO) according to which the network entity 105 may transmit downlink signaling to two different UEs 115 simultaneously, uplink MU-MIMO according to which the network entity 105 may receive uplink signaling from two different UEs 115 simultaneously, or downlink and uplink MU-MIMO (which may be referred to herein as full-duplex operation) according to which the network entity 105 may transmit downlink signaling to a first UE 115 while simultaneously receiving uplink signaling from a second UE 115. A network entity 105 may further support enhanced MIMO (eMIMO) or further enhanced MIMO (FeMIMO), which may be associated with an FeMIMO beam management session. In accordance with full-duplex operation, a wireless device may be capable of transmitting and receiving simultaneously. In other words, the wireless device may support simultaneous uplink and downlink transmissions (such as an uplink transmission and a downlink transmission that at least partially overlap in time).

In some aspects, a network entity 105 and a UE 115 may support various evaluation techniques and performance evaluation metrics associated with different deployment scenarios for full-duplex operation (such as for NR duplexing). Further, a network entity 105 and a UE 115 may support one or more techniques to support co-existence with other systems in any co-channels or adjacent channels for subband non-overlapping full-duplex operation or for dynamic or flexible TDD, or for both. For example, a network entity 105 and a UE 115 may support techniques associated with duplex operation evolution for NR TDD across various spectrums, including in an unpaired spectrum. In such examples, the network entity 105 may support full-duplex operation, a UE 115 may support half-duplex operation, and the network entity 105 and the UE 115 may configure or expect no restrictions on which frequency ranges are available for use.

Such techniques may include various full-duplex types or schemes and corresponding metrics to evaluate a performance of such full-duplex types or schemes, inter-network entity (e.g., inter-gNB) and inter-UE CLI mitigation techniques, intra-subband CLI and inter-subband CLI mitigation techniques (such as in the implementation of subband non-overlapping full-duplex), or a metric-based evaluation procedure for an impact of full-duplex operation on half-duplex operation (assuming co-existence in co-channel and adjacent channels). Additionally, or alternatively, such techniques may include a metric-based evaluation procedure for an impact on RF constraints considering adjacent channel co-existence or for an impact on RF constraints considering self-interference, inter-subband CLI and inter-operator CLI at network entities 105, and inter-subband CLI and inter-operator CLI at UEs 115. Further, such techniques may include antenna or RF and algorithm design for interference mitigation, including antenna isolation, transmission interference management suppression in a receive-side part, filtering, and digital interference suppression. Further, such techniques may comply with one or more regulatory or network specifications associated with full-duplex operation in TDD unpaired spectrums.

Further, some systems may support one or more techniques associated with dynamic or flexible TDD or SBFD, or both, for gNB-gNB CLI handling. Such one or more techniques may include mechanisms related to gNB-to-gNB CLI measurement and reporting, coordinated scheduling, spatial domain designs, receiver designs, UE and network entity transmission and reception timing, power control-based designs, or sensing-based mechanisms, among other example techniques associated with UE-to-UE CLI handling. In some aspects, such one or more techniques may be associated with an identification of whether a scheme or design include over-the-air (OTA) or backhaul information exchanges.

In some implementations, a first network entity 105 may support one or more signaling- or configuration-based mechanisms according to which the first network entity 105 may measure CLI from a second network entity 105 and report one or more interference metrics associated with the measured CLI on a per-subband basis. For example, the first network entity 105 may receive an indication of a set (of one or more) subbands, may measure a set of interference metrics associated with the indicated set of subbands, and may transit a measurement report to indicate or otherwise convey information associated with at least a subset of the measured interreference metrics. The first network entity 105 may receive the indication of the set of subbands in one or more of various ways, including via an indication of a respective set of resource blocks for each of the indicated subbands or via a bitmap that indicates the set of subbands from a larger set of subbands. Further, the first network entity 105 may generate and transmit the measurement report in one or more of various ways.

Figure 2:
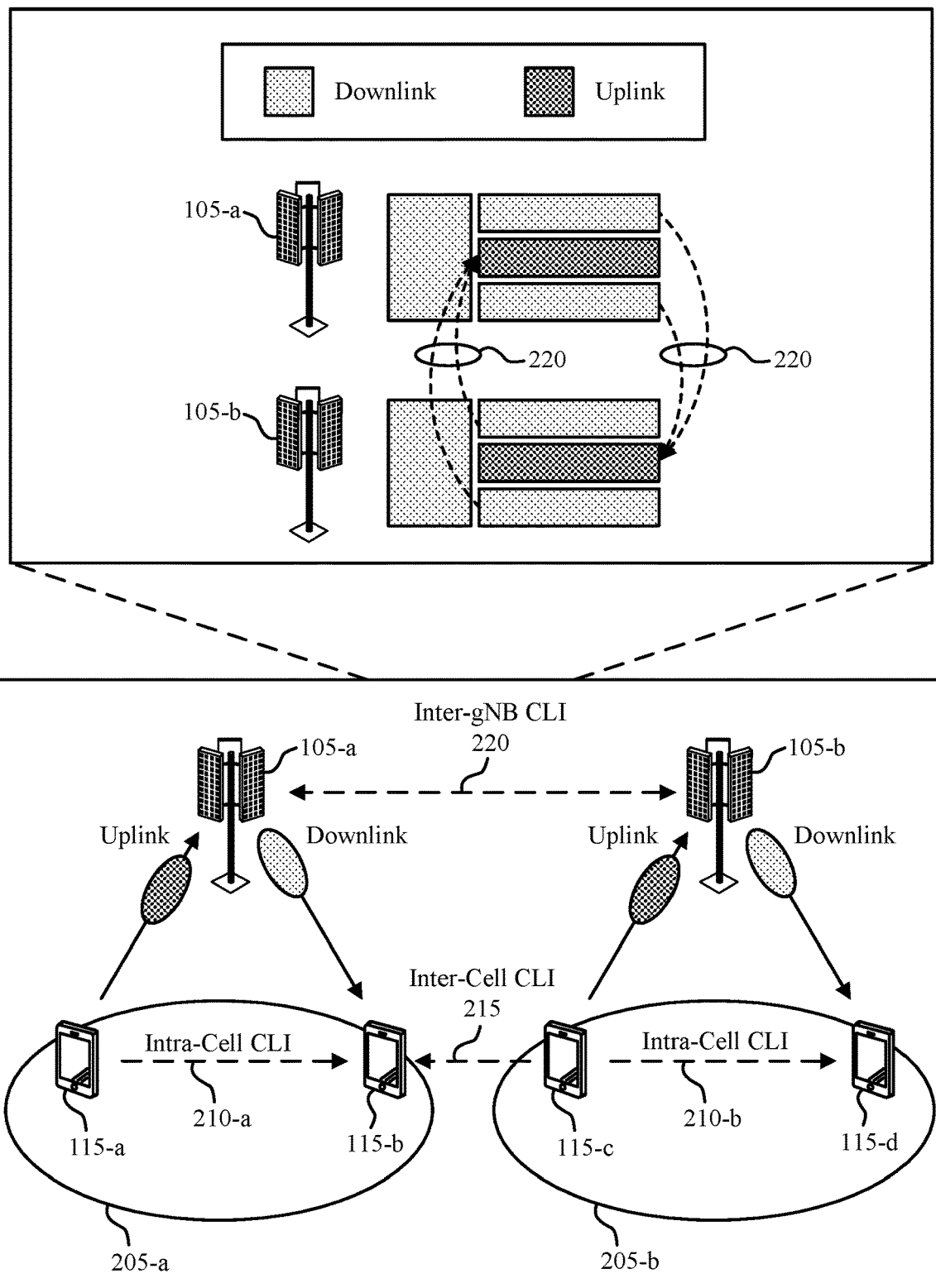
FIG. 2 illustrates an example of an interference measurement diagram that supports inter-network entity subband-based CLI measurement and reporting in accordance with one or more aspects of the present disclosure.

FIG. 2 illustrates an example of an interference measurement diagram 200 that supports inter-network entity subband-based CLI measurement and reporting in accordance with one or more aspects of the present disclosure. The interference measurement diagram 200 may implement or be implemented to realize or facilitate aspects of the wireless communications system 100. For example, the interference measurement diagram 200 illustrates potential interference (and corresponding interference measurements) between various wireless communication devices, including a UE 115-a, a UE 115-b, a UE 115-c, and a UE 115-d as well as a network entity 105-a and a network entity 105-b. The UE 115-a, the UE 115-b, the UE 115-c, and the UE 115-d may each be examples of UEs 115 as illustrated by and described with reference to FIG. 1. The network entity 105-a and the network entity 105-b may each be examples of network entities 105 as illustrated by and described with reference to FIG. 1.

As illustrated by the interference measurement diagram 200, the network entity 105-a may be associated with a cell 205-a and the network entity 105-b may be associated with a cell 205-b. Within the cell 205-a, the UE 115-a may transmit signaling (such as uplink signaling to the network entity 105-a) that causes intra-cell CLI 210-a at the UE 115-b. Similarly, within the cell 205-b, the UE 115-c may transmit signaling (such as uplink signaling to the network entity 105-b) that causes intra-cell CLI 210-b at the UE 115-d. In some deployment scenarios, such as in deployment scenarios in which the UE 115-b and the UE 115-c are relatively near each other (despite being served by different cells), the signaling transmitted by the UE 115-c may cause inter-cell CLI 215 at the UE 115-b. In some aspects, the UE 115-b may experience inter-cell CLI 215 from the UE 115-c in scenarios in which the network entity 105-a and the network entity 105-b support dynamic TDD operation. As such, the UE 115-b may experience intra-cell CLI 210-a or inter-cell CLI 215, or both. Further, in some deployment scenarios, the network entity 105-a may transmit signaling (such as downlink signaling to the UE 115-b) that causes inter-gNB CLI 220.

In examples in which the network entity 105-a and the network entity 105-b support SBFD, the intra-cell CLI 210-a, the intra-cell CLI 210-b, the inter-cell CLI 215, and the inter-gNB CLI 220 may include inter-subband CLI. In examples in which the network entity 105-a and the network entity 105-b support fully or partially overlapped full-duplex, the intra-cell CLI 210-a, the intra-cell CLI 210-b, the inter-cell CLI 215, and the inter-gNB CLI 220 may include intra-subband CLI. Accordingly, in some example deployments in which the network entity 105-a and the network entity 105-b communicate and schedule communication according to a network-side SBFD mode, the UE 115-b may experience inter-subband, intra-cell, inter-UE CLI from the UE 115-a (such as the intra-cell CLI 210-a) and inter-subband, inter-cell, inter-UE CLI from the UE 115-c (such as the inter-cell CLI 215).

In some deployments, the network entity 105-a and the network entity 105-b may each experience some amount of inter-subband or intra-subband, inter-gNB CLI (e.g., the inter-gNB CLI 220). For example, the network entity 105-a may transmit downlink signaling via one or more downlink subbands and such downlink signaling may cause inter-gNB CLI 220 in one or more uplink subbands (in addition to one or more downlink subbands) at the network entity 105-b. Similarly, the network entity 105-b may transmit downlink signaling via one or more downlink subbands and such downlink signaling may cause inter-gNB CLI 220 in one or more uplink subbands (in addition to one or more downlink subbands) at the network entity 105-a.

In some implementations, the network entity 105-a and the network entity 105-b may support techniques associated with inter-gNB CLI mitigation for deployments involving subband non-overlapping full-duplex scenarios, for deployments involving partially or fully overlapping full-duplex scenarios, or for deployments involving dynamic TDD scenarios, or any combination thereof. In some implementations, the network entity 105-*a* and the network entity 105-*b* may support one or more signaling- or configuration-based mechanisms according to which one or both of the network entity 105-*a* and the network entity 105-*b* may measure inter-gNB CLI 220 and report the measured inter-gNB CLI 220 to one or more of an associated CU 160, an operations, administration, and maintenance (OAM) entity, or a neighboring base station 140 (e.g., the other of the network entity 105-*a* and the network entity 105-*b*).

For example, the network entity 105-*a* may receive an indication of a set of subbands (such as a set of one or more subbands) from a CU 160, an OAM entity, or the network entity 105-*b* and may measure the inter-gNB CLI 220 in each of the indicated set of subbands. In some aspects, the network entity 105-*a* may measure the indicated set of subbands during a time period during which the network entity 105-*b* transmits one or more reference signals. As such, the network entity 105-*a* may obtain the measurements of the inter-gNB CLI 220 based on measuring interference associated with or caused by the reference signal(s) transmitted by the network entity 105-*b*. The network entity 105-*a* may transmit a measurement report including information associated with the measured inter-gNB CLI 220 to one or more of a CU 160, an OAM entity, or the network entity 105-*b*. Additional details relating to such a measurement and reporting of the inter-gNB CLI 220 are illustrated by and described with reference to FIG. 3.

Further, although the subband allocations associated with the network entity 105-*a* and the network entity 105-*b* are illustrated and described in the context of the interference measurement diagram 200 as including one uplink subband and two downlink subbands, the network entity 105-*a* and the network entity 105-*b* may support any number of uplink subbands and any number of downlink subbands. For example, the network entity 105-*a* or the network entity 105-*b*, or both, may support or configure an allocation for one uplink subband and one downlink subband, two uplink subbands and two downlink subbands, two uplink subbands and one downlink subband, and so on. Generally, the network entity 105-*a* or the network entity 105-*b*, or both, may support or configure a subband allocation for X uplink subbands and Y downlink subbands, where X and Y may be any numbers and may be the same or different.

Figure 3:
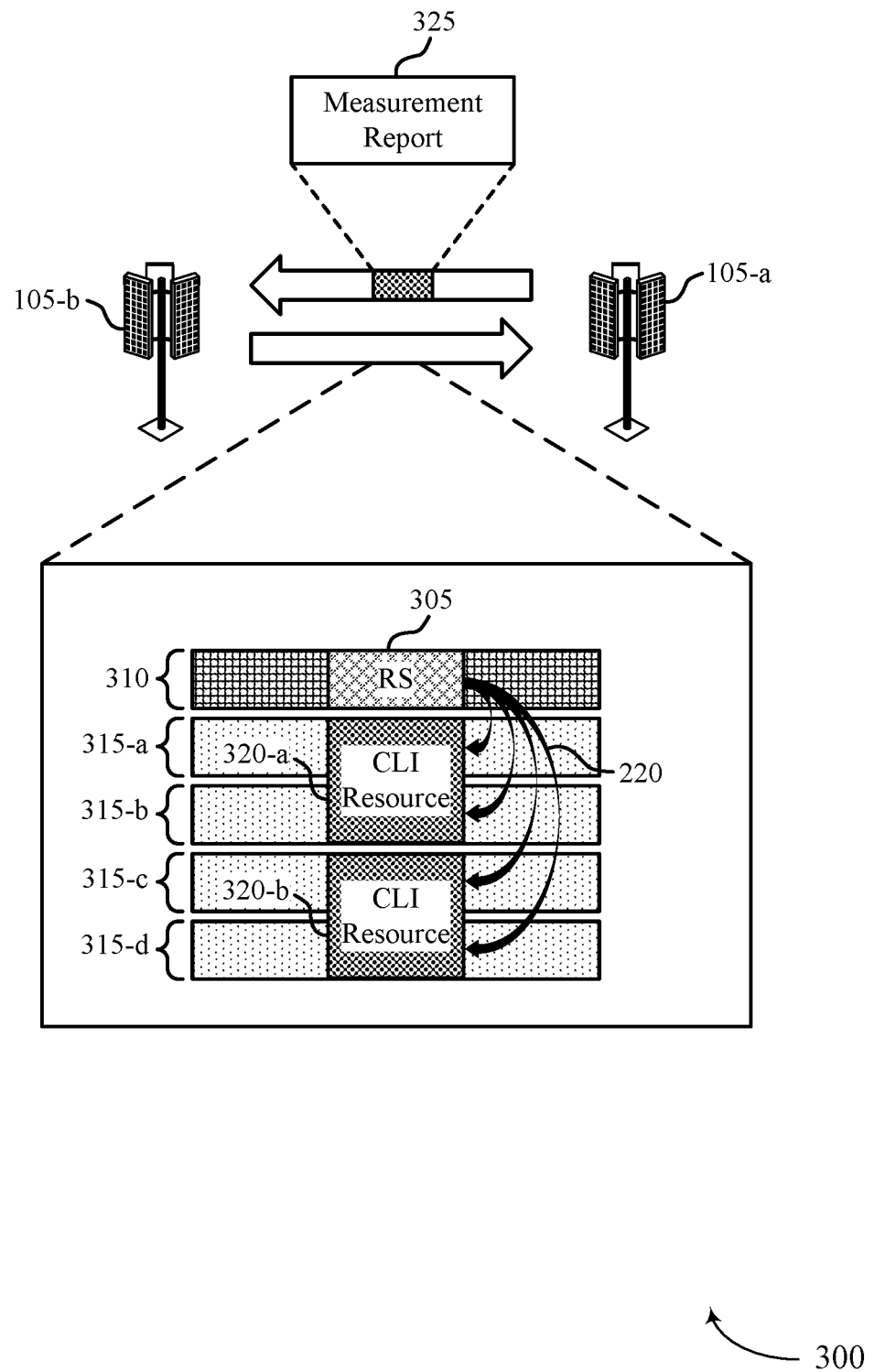
FIG. 3 illustrates an example of a signaling diagram that supports inter-network entity subband-based CLI measurement and reporting in accordance with one or more aspects of the present disclosure.

FIG. 3 illustrates an example of a signaling diagram 300 that supports inter-network entity subband-based CLI measurement and reporting in accordance with one or more aspects of the present disclosure. The signaling diagram 300 may implement or be implanted to realize or facilitate aspects of the wireless communications system 100 or the interference measurement diagram 200. For example, the signaling diagram 300 illustrates communication between the network entity 105-*a* and the network entity 105-*b*, which may be examples of corresponding devices illustrated and described herein, including with reference to FIGS. 1 and 2.

In some implementations, the network entity 105-*b* may transmit a reference signal 305 (illustrated as RS 305 in FIG. 3) via a transmission bandwidth 310, which may be associated with a downlink bandwidth of the network entity 105-*b*. In some scenarios, the reference signal 305 may cause inter-gNB CLI 220 across one or more subbands of the network entity 105-*a*, including one or more of a subband 315-*a*, a subband 315-*b*, a subband 315-*c*, and a subband 315-*d*.

In some implementations, the network entity 105-*a* (e.g., a measuring network entity 105 or a measuring gNB) may report one or more inter-gNB CLI metrics per subband for a given inter-gNB CLI resource (e.g., for a given one or more of a CLI resource 320-*a* and a CLI resource 320-*b*). For example, the network entity 105-*a* may store or save a configured CLI resource number and may use the stored or saved configured CLI resource number when measuring the inter-gNB CLI 220. As such, if the network entity 105-*a* is configured with a CLI resource number or identifier (ID) that corresponds to the CLI resource 320-*a* and the CLI resource 320-*b*, the network entity 105-*a* may measure and report one or more CLI metrics per subband that is associated with (e.g., that overlaps in frequency with) at least one of the CLI resource 320-*a* and the CLI resource 320-*b*. Accordingly, the network entity 105-*a* may measure the inter-gNB CLI 220 in each of the subband 315-*a*, the subband 315-*b*, the subband 315-*c*, and the subband 315-*d*. The measured subbands may be contiguous or non-contiguous.

The network entity 105-*a* may measure inter-subband or intra-subband inter-gNB CLI 220, which may assist in cross-gNB subband configuration and coordination for inter-gNB CLI mitigation. For example, in accordance with obtaining one or both of inter-subband and intra-subband inter-gNB CLI 220, the network entity 105-*a* may transmit a measurement report 325 indicating inter-subband or intra-subband inter-gNB CLI measurements, or both. The network entity 105-*a* may transmit the measurement report 325 to a CU 160, an OAM entity, or the network entity 105-*b*, or any combination thereof. For example, the network entity 105-*a* may transmit the measurement report 325 via backhaul signaling or OTA signaling from a measuring gNB (e.g., the network entity 105-*a*) to a CU 160 or from a measuring gNB (e.g., the network entity 105-*a*) to another neighbor gNB or DU (e.g., the network entity 105-*b*, as illustrated in the example of FIG. 3).

In implementations in which the network entity 105-*b* receives the measurement report 325, the network entity 105-*b* may, based on the per-subband report indicated by the measurement report 325, determine, select, or otherwise configure a minimum guard band between downlink and uplink subbands across two or more network entities 105. In some aspects, the network entity 105-*b* may determine, select, or configure the minimum guard band considering both the CLI metric(s) indicated via the measurement report 325 and a target spectrum usage.

In some aspects, the network entity 105-*a* may measure the gNB CLI 220 in accordance with an operating communication mode of the network entity 105-*a*. For example, the network entity 105-*a* may support dynamic TDD or SBFD (e.g., network-side SBFD). In deployments in which the network entity 105-*a* communicates in accordance with an SBFD operation, the network entity 105-*a* may measure and report inter-gNB CLI 220 per subband, including for a single uplink subband, for multiple uplink subbands, for a single downlink subband, or for multiple downlink subbands, or for any combination thereof. To measure the inter-gNB CLI 220 for one or more uplink subbands, the network entity 105-*a* may measure, determine, calculate, or otherwise identify one or more CLI-received signal strength indicator (RSSI) metrics or one or more CLI-signal-to-interference-plus-noise ratio (SINR) metrics. To measure the inter-gNB CLI 220 for one or more downlink subbands, the network entity 105-*a* may measure, determine, calculate, or otherwise identify one or more CLI-reference signal received power (RSRP) metrics or one or more CLI-RSSI metrics.

For example, the network entity 105-*a* may measure the reference signal 305 (e.g., a CLI reference signal) in one or more uplink subbands (via one or more RSSI or SINR metrics) for inter-subband leakage and may measure the reference signal 305 in one or more downlink subbands (via one or more RSRP or RSSI metrics) for intra-subband CLI, which may impact a receiver dynamic range or receiver automatic gain control (AGC) blocking, or both. In implementations in which the network entity 105-*a* measures the inter-gNB CLI 220 in one or more uplink subbands or one or more downlink subbands, the network entity 105-*a* may report (via the measurement report 325) interference metrics for uplink subbands exclusively, interference metrics for downlink subbands exclusively, or interference metrics for both uplink and downlink subbands. In some implementations, a CU 160 or an OAM entity may configure or indicate whether the network entity 105-*a* is to report exclusively uplink subbands, exclusively downlink subbands, or all uplink and downlink subbands.

The network entity 105-*a* may receive an indication of a set of subbands in which to measure the inter-gNB CLI 220 in one or more of various ways. In some implementations, a CU 160 or an OAM entity may explicitly configure a starting resource block and one or both of a quantity of resource blocks (counted from the starting resource block) or an ending resource block per measured subband for inter-gNB reference signal reception (e.g., for inter-gNB CLI measurements) for the network entity 105-*a* (e.g., a receiving or reception gNB). Additionally, or alternatively, a CU 160 or an OAM entity may explicitly configure a starting resource block and one or both of a quantity of resource blocks (counted from the starting resource block) or an ending resource block for inter-gNB reference signal transmission for the network entity 105-*b* (e.g., a transmitting or transmission gNB). The inter-gNB reference signal (e.g., the reference signal 305) may be a downlink reference signal (e.g., a channel state information (CSI) reference signal (CSI-RS) or a synchronization signal block (SSB)) or may be a defined inter-gNB CLI reference signal (e.g., a reference signal dedicated for inter-gNB CLI measurement). In some aspects, the reference signal 305 may be defined for FR2-1 and FR2-2 and may be associated with a format of a remote interference management (RIM) reference signal (RIM-RS).

Additionally, or alternatively, a CU 160 or an OAM entity may explicitly configure and include a bitmap that indicates which subbands (e.g., which pre-configured subbands) are expected to be reported for inter-gNB reference signal reception associated with inter-gNB CLI measurements. For example, the network entity 105-*a* may be configured with a first set of subbands (e.g., pre-configured subbands may be configured via other signaling) and the network entity 105-*a* may receive, from the CU 160 or the OAM entity, a bitmap that indicates a second set of subbands from the first set of subbands. In such examples, the network entity 105-*a* may measure the inter-gNB CLI 220 in each of the second set of subbands may report an interference metric associated with each (or a subset) of the second set of subbands via the measurement report 325.

The network entity 105-*a* may include various information in the measurement report 325 in accordance with one or more of various report generation techniques or configurations. For example, for a wideband inter-gNB CLI report, a CU 160 or an OAM entity may indicate, to the network entity 105-*a*, that the network entity 105-*a* is to average measurements over all subbands or over a set of indicated subbands. If subbands are indicated for measurement, the indication of the subbands may be included in an inter-gNB CLI report config information element configuration in, for example, backhaul signaling.

The network entity 105-*a* may support one or more different mechanisms or procedures according to which the network entity 105-*a* may transmit the measurement report 325. For example, the network entity 105-*a* may transmit the measurement report 325 (e.g., an inter-gNB subband CLI report) in a periodic manner, an aperiodic manner, or in an event-triggered manner (such as if a measured inter-gNB CLI 220 is greater than or equal to an interference metric threshold). In some implementations, the network entity 105-*a* may perform per-subband inter-gNB CLI reporting (e.g., to a CU 160) that includes per subband measurement results for all indicated subbands (e.g., all subbands that are indicated for inter-gNB CLI measurement). In such implementations, the measurement report 325 may include a CLI metric per each subband with an associated subband ID or an associated gNB ID. Alternatively, the measurement report 325 may include CLI metrics per subband in a configured or defined order that is mutually known between the network entity 105-*a* and the entity that receives the measurement report 325. For example, the network entity 105-*a* may generate the measurement report 325 such that per subband CLI metrics are listed in descending or ascending order of associated subband ID.

In some other implementations, the network entity 105-*a* may generate and transmit the measurement report 325 in accordance with an interference metric threshold (e.g., a CLI threshold). In some aspects, the CU 160 or the OAM entity may indicate the interference metric threshold to the network entity 105-*a*. In some other aspects, the interference metric threshold may be fixed or defined by a network specification. In such implementations, the network entity 105-*a* may report a subset of the configured or indicated subbands (e.g., to the CU 160) based on the threshold.

In some examples, the network entity 105-*a* may report, via the measurement report 325, one or more CLI metrics for one or more subbands for which the network entity 105-*a* measures an inter-gNB CLI 220 greater than or equal to the interference metric threshold, with each associated subband ID reported via the measurement report 325 as well. Additionally, or alternatively, the network entity 105-*a* may report, via the measurement report 325, one or more CLI metrics for one or more subbands for which the network entity 105-*a* measures an inter-gNB CLI 220 less than the interference metric threshold, with each associated subband ID reported via the measurement report 325 as well.

Additionally, or alternatively, the network entity 105-*a* may report, via the measurement report 325, one or more CLI metrics for a quantity N of subbands that have a relatively greatest measured inter-gNB CLI 220 among the subbands for which the network entity 105-*a* measures an inter-gNB CLI 220 less than the interference metric threshold, with each associated subband ID reported via the measurement report 325 as well. Additionally, or alternatively, the network entity 105-*a* may report, via the measurement report 325, one or more CLI metrics for a quantity N of subbands that have a relatively lowest inter-gNB CLI 220 among the subbands for which the network entity 105-*a* measures an inter-gNB CLI 220 less than the interference metric threshold, with each associated subband ID reported via the measurement report 325 as well.

For periodic or aperiodic measurement reports 325 (e.g., inter-gNB CLI reports), the CU 160 or the OAM entity may indicate a CLI threshold (e.g., an interference metric threshold) or the CLI threshold may be defined by a network specification. Based on the threshold, the network entity 105-*a* (e.g., a measuring gNB) may report an indicator (e.g., a 1 or a 0) per subband to indicate whether the subband has an inter-gNB CLI 220 less than the CLI threshold or not. For example, a first indicator value may indicate that the network entity 105-a measured an inter-gNB CLI 220 for a corresponding subband less than the CLI threshold and a second indicator value may indicate that the network entity 105-a measured an inter-gNB CLI 220 for a corresponding subband greater than or equal to the CLI threshold.

Additionally, or alternatively, the CU or the OAM entity may indicate (e.g., explicitly indicate via signaling) a quantity of a top N subbands for which the network entity 105-a is expected to report via the measurement report 325. In some examples, the N subbands may be the subbands associated with the lowest inter-gNB CLI measurements (e.g., the subbands associated with the top lowest inter-gNB CLI metrics) among all measured subbands, with each associated subband ID reported via the measurement report 325 as well per gNB. Additionally, or alternatively, the N subbands may be associated with the largest inter-gNB CLI measurements (e.g., the subbands associated with the worst largest inter-gNB CLI metrics) among all measured subbands, with each associated subband ID reported via the measurement report 325 as well per gNB.

In some implementations, the network entity 105-a may generate the measurement report 325 such that some reported interference metrics (e.g., CLI metrics) are reported differentially. In other words, the network entity 105-a may support a differential inter-gNB subband CLI report. In such implementations, the network entity 105-a may generate the differential report in one of various formats, where different formats may be associated with for which one or more subbands interference metrics are indicated absolutely and for which one or more subbands an interference metrics are indicated differentially.

In some examples, the network entity 105-a may report an absolute CLI metric value for a strongest (e.g., worst) resource or subband and may report differential CLI metric delta values for each of a remainder of the reported resources or subbands. In such examples, the CLI metric delta values may be interpreted as negative delta values. Further, in such examples, the measurement report 325 may include a first field to indicate which CLI resource ID or which subband ID corresponds to the strongest (e.g., worst) CLI metric and may include a second field to indicate the absolute strongest value. As such, the network entity 105-a may use the rest of the fields (or at least a next set of fields) of the measurement report 325 for remaining delta values. In some aspects, the network entity 105-a may configure the measurement report 325 such that the fields including the remaining delta values are in sequential order in terms of subband ID with the subband ID associated with the absolutely reported strongest CLI metric skipped.

In some other examples, the network entity 105-a may report an absolute CLI metric value for a weakest (e.g., best) resource or subband and may report differential CLI metric delta values for each of a remainder of the reported resources or subbands. In such examples, the CLI metric delta values may be interpreted as positive delta values. Further, in such examples, the measurement report 325 may include a first field to indicate which CLI resource ID or which subband ID corresponds to the weakest (e.g., best) CLI metric and may include a second field to indicate the absolute weakest value. As such, the network entity 105-a may use the rest of the fields (or at least a next set of fields) of the measurement report 325 for remaining delta values. In some aspects, the network entity 105-a may configure the measurement report 325 such that the fields including the remaining delta values are in sequential order in terms of subband ID with the subband ID associated with the absolutely reported weakest CLI metric skipped.

In some other examples, the network entity 105-a may report, via the measurement report 325, a set of one or more resources or subbands for which the network entity 105-a measures a CLI metric greater than or equal to an interference metric threshold. In such examples, the network entity 105-a may report an absolute CLI metric for a strongest (e.g., worst) resource or subband and may report differential CLI delta metric values for the rest of the subset of resources or subbands for which the network entity 105-a measures CLI metrics greater than or equal to the interference metric threshold. Further, in such examples, the measurement report 325 may include one or more fields to indicate the strongest (e.g., worst) resource or subband ID and corresponding absolute value. The rest of the fields (or at least a next set of fields) of the measurement report 325 may include the delta values and, in some aspects, may be in order (in terms of subband ID) with a skipping of the strongest resource or subband, with each associated resource or subband ID (e.g., one resource or subband ID for each reported delta value) also included in the measurement report 325.

In some other examples, the network entity 105-a may report, via the measurement report 325, a set of one or more resources or subbands for which the network entity 105-a measures a CLI metric less than an interference metric threshold. In such examples, the network entity 105-a may report an absolute CLI metric for a weakest (e.g., best) resource or subband and may report differential CLI delta metric values for the rest of the subset of resources or subbands for which the network entity 105-a measures CLI metrics less than the interference metric threshold. Further, in such examples, the measurement report 325 may include one or more fields to indicate the weakest (e.g., best) resource or subband ID and corresponding absolute value. The rest of the fields (or at least a next set of fields) of the measurement report 325 may include the delta values and, in some aspects, may be in order (in terms of subband ID) with a skipping of the weakest resource or subband, with each associated resource or subband ID (e.g., one resource or subband ID for each reported delta value) also included in the measurement report 325.

In some implementations, the CU 160 may configure the network entity 105-a to report a top X strongest or weakest CLI differential values. In other words, the CU 160 may configure the network entity 105-a to report a strongest or weakest CLI metric absolutely and to report a next strongest or weakest set of X-1 CLI metrics differentially relative to the absolutely indicated strongest or weakest CLI metric. In such implementations, the network entity 105-a may include fields in the measurement report 325 to indicate the strongest or weakest resource or subband ID and corresponding absolute value and fields to indicate, relative to the absolute value, the remaining top strongest or weakest X-1 delta values. In some aspects, the network entity 105-a may generate the measurement report 325 such that the fields for the remaining X-1 delta values are in sequential order (e.g., in terms of resource or subband ID) with a skipping of the strongest or weakest resource or subband, with each associated resource or subband ID (e.g., one resource or subband ID for each reported delta value per gNB) also included in the measurement report 325.

As such, an entity that receives the measurement report 325 (e.g., the network entity 105-b, the CU 160, or the OAM entity) may identify or ascertain information associated with the inter-gNB CLI 220 experienced at the network entity 105-*a* and may adjust one or more communication parameters (e.g., one or more transmit powers, or one more scheduling parameters, or one or more subband configurations) based on the inter-gNB CLI 220 experienced at the network entity 105-*a*. Accordingly, the network entity 105-*a* may operate in an environment with less inter-gNB CLI 220, which may increase a likelihood for successful communication to or from the network entity 105-*a*. Likewise, the network entity 105-*a* and any devices with which the network entity 105-*a* communicates may experience higher data rates, greater throughput, greater spectral efficiency, and potentially lower power costs as a result of performing or monitoring for fewer retransmissions.

Figure 4:
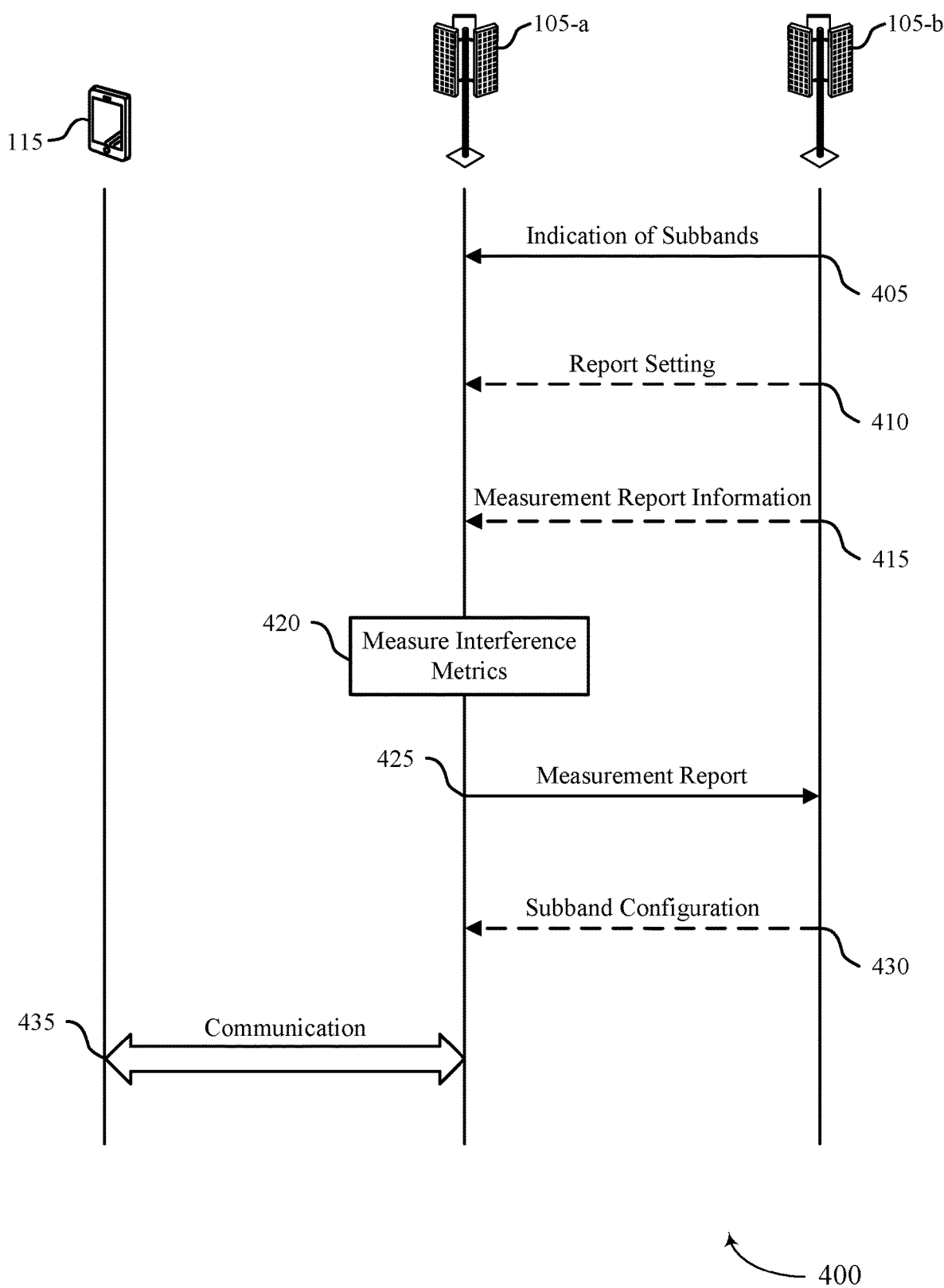
FIG. 4 illustrates an example of a process flow that supports inter-network entity subband-based CLI measurement and reporting in accordance with one or more aspects of the present disclosure.

FIG. 4 illustrates an example of a process flow 400 that supports inter-network entity subband-based CLI measurement and reporting in accordance with one or more aspects of the present disclosure. The process flow 400 may implement or may be implemented to realize or facilitate aspects of the wireless communications system 100, the interference measurement diagram 200, and the signaling diagram 300. For example, the process flow 400 illustrates communication between a UE 115, a network entity 105-*a*, and a network entity 105-*b*. The UE 115, the network entity 105-*a*, and the network entity 105-*b* as illustrated by and described with reference to FIG. 4 may be examples of corresponding devices illustrated and described herein, including with reference to FIGS. 1-3. In some examples, the network entity 105-*a* and the network entity 105-*b* may each support a dynamic TDD communication scheme or a full-duplex communication scheme, such as a SBFD communication scheme.

In the following description of the process flow 400, the operations may be performed (such as reported or provided) in a different order than the order shown, or the operations performed by the example devices may be performed in different orders or at different times. Some operations also may be left out of the process flow 400, or other operations may be added to the process flow 400. Further, although some operations or signaling may be shown to occur at different times for discussion purposes, these operations may actually occur at the same time.

At 405, the network entity 105-*a* may receive, and the network entity 105-*b* may transmit, an indication of a set of subbands associated with a CLI measurement. The set of subbands may be indicated from a larger set of subbands configured for the network entity 105-*a*. In some aspects, the CLI measurement may be associated with interference between the network entity 105-*a* and the network entity 105-*b*.

The indication of the set of subbands associated with the CLI measurement may also include information associated with a respective set of resource blocks associated with each subband of the set of subbands. Such information may include one or more of a respective starting resource block index, a respective quantity of resource blocks, and a respective ending resource block index for each subband of the set of subbands. Additionally, or alternatively, the indication received by the network entity 105-*a* at 405 may include an indication of a bitmap associated with the subbands that are configured for the network entity 105-*a*. The bitmap may indicate the subset of subbands from the set of subbands that are configured for the network entity 105-*a*.

At 410, the network entity 105-*a* may receive, and the network entity 105-*b* may transmit, an indication of a reporting setting associated with the measurement report. The reporting setting may include one of periodic reporting, event-triggered reporting, or aperiodic reporting. In some aspects, the event-triggered reporting setting and the aperiodic reporting setting may be associated with an interference metric threshold (e.g., may be triggered by a CLI measurement greater than the interference metric threshold).

At 415, the network entity 105-*a* may receive, and the network entity 105-*b* may transmit, measurement report information. The measurement report information may include an indication of an interference metric threshold, an indication of a quantity of subbands for which the network entity 105-*a* is to report interference metrics, an indication of a quantity of interference metrics for which the first network entity is to report differential indications, or any combination thereof. In examples in which the network entity 105-*a* is to report differential indications, a quantity of the one or more interference metrics may be equal to the quantity of interference metrics for which the network entity 105-*a* is to report differential indications.

At 420, the network entity 105-*a* may measure a set of interference metrics associated with the set of subbands in accordance with receiving the indication of the set of subbands at 405. In some examples, a respective interference metric of the set of interference metrics is associated with a respective subband of the set of subbands.

At 425, the network entity 105-*a* may transmit, and the network entity 105-*b* may receive, a measurement report associated with at least one or more interference metrics of the set of interference metrics. The one or more interference metrics may be associated with one or more subbands of the set of subbands.

In some examples, the measurement report may be a wideband measurement report that includes an indication of an averaged interference metric, which may be associated with an average of the set of interference metrics associated with the set of subbands. In some examples, the measurement report may include one or more interference metrics in accordance with the interference metric threshold received by the network entity 105-*a* at 415 and may include one or more subband IDs associated with the one or more subbands. In some examples, the interference metrics and associated subband IDs may be included in the measurement report in accordance with each interference metric being equal to or greater than the interference metric threshold. In some examples, the interference metrics and associated subband IDs may be included in the measurement report in accordance with each interference metric being less than the interference metric threshold.

In some examples, the one or more interference metrics may include a single interference metric and the one or more subband IDs include a single subband ID associated with a subband corresponding to the single interference metric. In some examples, the single interference metric and the single subband ID may be included in the measurement report in accordance with the single interference metric being either the greatest interference metric or the smallest interference metric relative to a subset of interference metrics that are less than the interference metric threshold. In some examples, the measurement report may include a set of indicators associated with the set of subbands. A respective indicator of the set of indicators may correspond to a respective subband of the set of subbands. Additionally, the set of indicators may indicate for which subbands of the plurality of subbands a corresponding metric may be less than or greater than the interference metric threshold. In some examples, the one or more interference metrics may include either a set of largest interference metrics or a set of smallest interference metrics relative to the set of interference metrics.

In some examples, the measurement report may include an absolute indication for one interference metric of the one or more interference metrics and a set of differential indications, relative to the absolute indication, for a remainder of the one or more interference metrics. The one absolute interference metric may be either the greatest interference metric or the smallest interference metric relative to the remainder of the one or more interference metrics. The set of differential indications may be associated with either negative delta values relative to the greatest interference metric or positive delta values relative to the smallest interference metric. In some examples, the one or more interference metrics may be included in the measurement report in accordance with each of the one or more interference metrics being equal to or greater than an interference metric threshold, and the one absolute interference metric may be the greatest interference metric relative to the remainder of the one or more interference metrics. Similarly, in some examples, the one or more interference metrics may be included in the measurement report in accordance with each of the one or more interference metrics being less than an interference metric threshold, and the one absolute interference metric may be the smallest interference metric relative to the remainder of the one or more interference metrics.

In some examples, the measurement report may include each of the set of interference metrics associated with the set of subbands in accordance with the set of subbands being indicated by the bitmap received by the network entity 105-*a* at 405. In some examples, the measurement report may include an indication of each of the one or more interference metrics associated with the one or more subbands, where the one or more subbands may include one or more uplink subbands, one or more downlink subbands, one or more portions of an uplink subband, or one or more portions of a downlink subband, or any combination thereof. A first interference metric associated with an uplink subband may be associated with an inter-subband leakage interference measured with an interference metric of RSSI or SINR and a second interference metric associated with a downlink subband may be associated with an intra-subband interference that may affect a receiver dynamic range or a receiver AGC blocking measured with an interference metric of RSRP or RSSI.

At 430, the network entity 105-*a* may receive, and the network entity 105-*b* may transmit, information associated with a subband configuration. In some examples, the subband configuration is associated with a guard band between an uplink subband and a downlink subband. In some examples, a size of the guard band may be based on the measurement report transmitted from the network entity 105-*a* to the network entity 105-*b* at 425.

At 435, the network entity 105-*a* may communicate with the UE 115-*a* in accordance with the subband configuration for the network-side SBFD operation.

Figure 5:
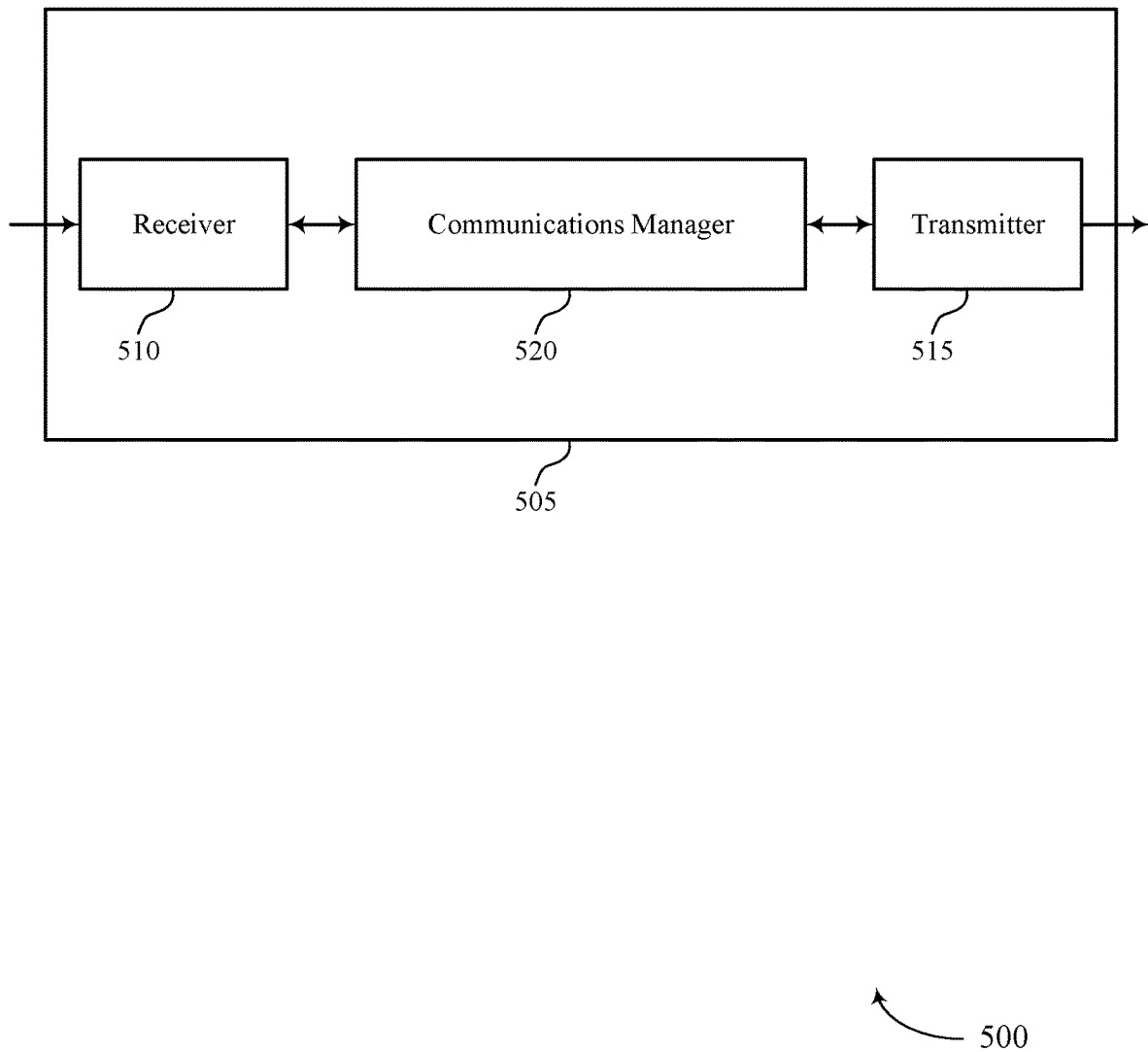
FIGS. 5 and 6 illustrate block diagrams of devices that support inter-network entity subband-based CLI measurement and reporting in accordance with one or more aspects of the present disclosure.

FIG. 5 illustrates a block diagram 500 of a device 505 that supports inter-network entity subband-based CLI measurement and reporting in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of inter-network entity subband-based CLI measurement and reporting as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a central processing unit (CPU), a graphics processing unit (GPU), an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first network entity in accordance with examples as disclosed herein. For example, the communications manager 520 may be configured as or otherwise support a means for receiving an indication of a set of subbands associated with a CLI measurement at the first network entity, where the set of subbands is indicated from a set of multiple subbands configured for the first network entity, and where the CLI measurement is associated with interference between the first network entity and a second network entity. The communications manager 520 may be configured as or otherwise support a means for measuring a set of interference metrics associated with the set of subbands in accordance with receiving the indication of the set of subbands, where a respective interference metric of the set of interference metrics is associated with a respective subband of the set of subbands. The communications manager 520 may be configured as or otherwise support a means for transmitting a measurement report associated with at least one or more interference metrics of the set of interference metrics, where the at least one or more interference metrics are associated with one or more subbands of the set of subbands.

Additionally, or alternatively, the communications manager 520 may support wireless communication in accordance with examples as disclosed herein. For example, the communications manager 520 may be configured as or otherwise support a means for transmitting, to a first network entity from a second network entity, an indication of a set of subbands associated with a CLI measurement at the first network entity, where the set of subbands is indicated from a set of multiple subbands configured for the first network entity, and where the CLI measurement is associated with interference between the first network entity and the second network entity. The communications manager 520 may be configured as or otherwise support a means for transmitting a set of one or more reference signals via the set of subbands in accordance with transmitting the indication of the set of subbands. The communications manager 520 may be configured as or otherwise support a means for receiving, at the second network entity from the first network entity, a measurement report associated with at least one or more interference metrics of a set of interference metrics, where the at least one or more interference metrics are associated with one or more subbands of the set of subbands.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources.

Figure 6:
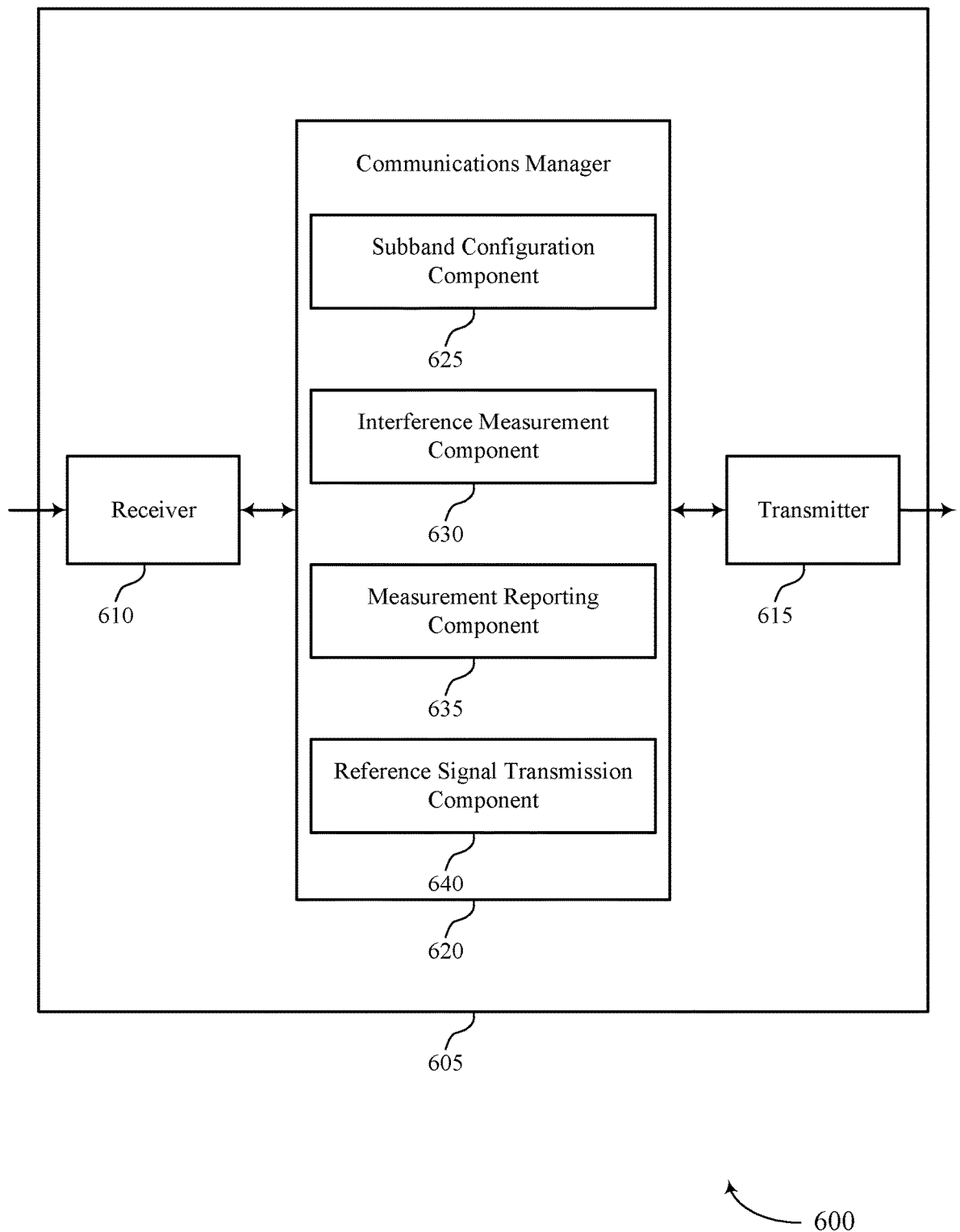

FIG. 6 illustrates a block diagram 600 of a device 605 that supports inter-network entity subband-based CLI measurement and reporting in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of inter-network entity subband-based CLI measurement and reporting as described herein. For example, the communications manager 620 may include a subband configuration component 625, an interference measurement component 630, a measurement reporting component 635, a reference signal transmission component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network entity in accordance with examples as disclosed herein. The subband configuration component 625 may be configured as or otherwise support a means for receiving an indication of a set of subbands associated with a CLI measurement at the first network entity, where the set of subbands is indicated from a set of multiple subbands configured for the first network entity, and where the CLI measurement is associated with interference between the first network entity and a second network entity. The interference measurement component 630 may be configured as or otherwise support a means for measuring a set of interference metrics associated with the set of subbands in accordance with receiving the indication of the set of subbands, where a respective interference metric of the set of interference metrics is associated with a respective subband of the set of subbands. The measurement reporting component 635 may be configured as or otherwise support a means for transmitting a measurement report associated with at least one or more interference metrics of the set of interference metrics, where the at least one or more interference metrics are associated with one or more subbands of the set of subbands.

Additionally, or alternatively, the communications manager 620 may support wireless communication in accordance with examples as disclosed herein. The subband configuration component 625 may be configured as or otherwise support a means for transmitting, to a first network entity from a second network entity, an indication of a set of subbands associated with a CLI measurement at the first network entity, where the set of subbands is indicated from a set of multiple subbands configured for the first network entity, and where the CLI measurement is associated with interference between the first network entity and the second network entity. The reference signal transmission component 640 may be configured as or otherwise support a means for transmitting a set of one or more reference signals via the set of subbands in accordance with transmitting the indication of the set of subbands. The measurement reporting component 635 may be configured as or otherwise support a means for receiving, at the second network entity from the first network entity, a measurement report associated with at least one or more interference metrics of a set of interference metrics, where the at least one or more interference metrics are associated with one or more subbands of the set of subbands.

Figure 7:
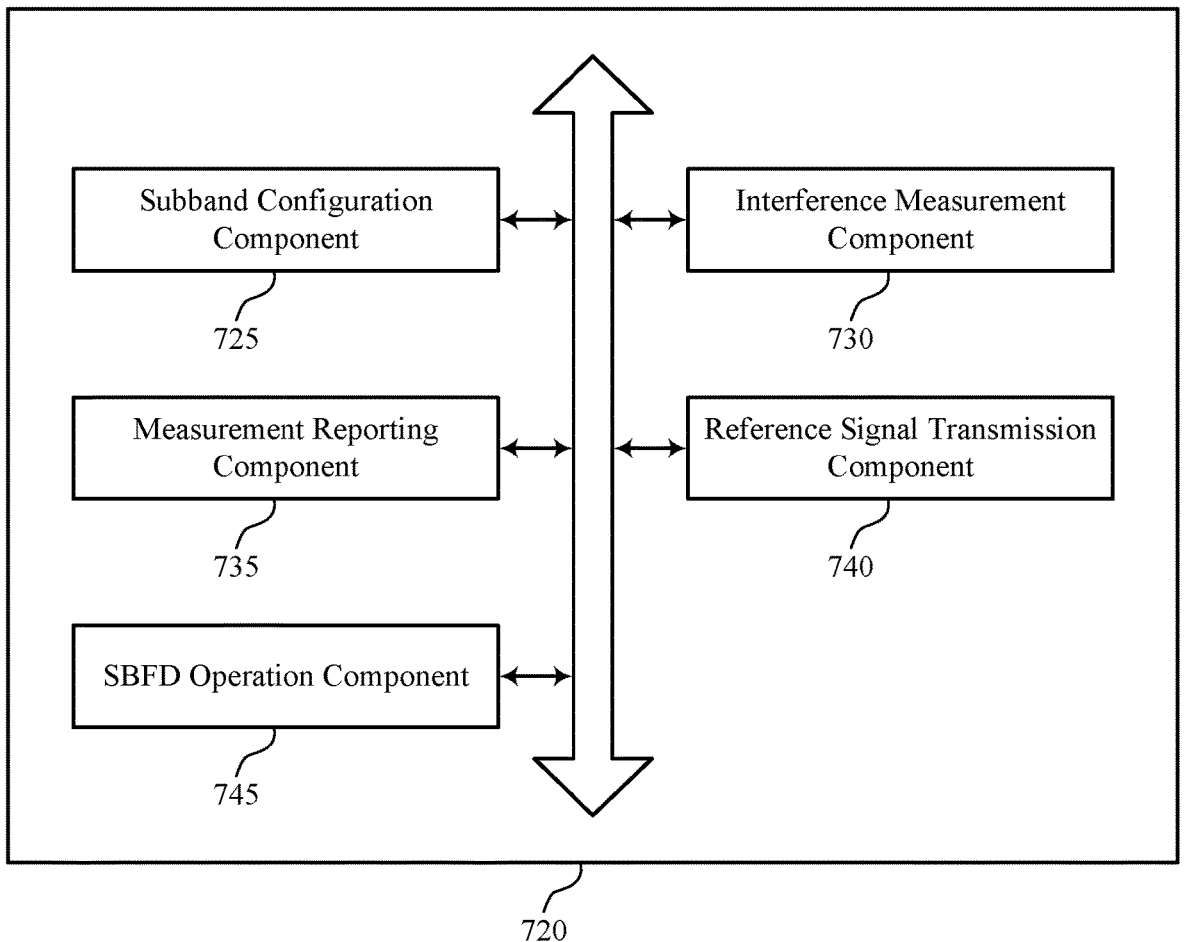
FIG. 7 illustrates a block diagram of a communications manager that supports inter-network entity subband-based CLI measurement and reporting in accordance with one or more aspects of the present disclosure.

FIG. 7 illustrates a block diagram 700 of a communications manager 720 that supports inter-network entity subband-based CLI measurement and reporting in accordance with one or more aspects of the present disclosure. The communications manager 720 may be an example of aspects of a communications manager 520, a communications manager 620, or both, as described herein. The communications manager 720, or various components thereof, may be an example of means for performing various aspects of inter-network entity subband-based CLI measurement and reporting as described herein. For example, the communications manager 720 may include a subband configuration component 725, an interference measurement component 730, a measurement reporting component 735, a reference signal transmission component 740, an SBFD operation component 745, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communication at a first network entity in accordance with examples as disclosed herein. The subband configuration component 725 may be configured as or otherwise support a means for receiving an indication of a set of subbands associated with a CLI measurement at the first network entity, where the set of subbands is indicated from a set of multiple subbands configured for the first network entity, and where the CLI measurement is associated with interference between the first network entity and a second network entity. The interference measurement component 730 may be configured as or otherwise support a means for measuring a set of interference metrics associated with the set of subbands in accordance with receiving the indication of the set of subbands, where a respective interference metric of the set of interference metrics is associated with a respective subband of the set of subbands. The measurement reporting component 735 may be configured as or otherwise support a means for transmitting a measurement report associated with at least one or more interference metrics of the set of interference metrics, where the at least one or more interference metrics are associated with one or more subbands of the set of subbands.

In some examples, the subband configuration component 725 may be configured as or otherwise support a means for receiving information associated with a subband configuration, where the subband configuration is associated with a guard band between an uplink subband and a downlink subband, and where a size of the guard band is based on the measurement report. In some examples, the SBFD operation component 745 may be configured as or otherwise support a means for communicating with a UE in accordance with the subband configuration for network-side subband full-duplex operation.

In some examples, to support receiving the indication of the set of subbands associated with the CLI measurement, the subband configuration component 725 may be configured as or otherwise support a means for receiving information associated with a respective set of resource blocks associated with each subband of the set of subbands, where the information includes one or more of a respective starting resource block index, a respective quantity of resource blocks, and a respective ending resource block index for each subband of the set of subbands.

In some examples, to support receiving the indication of the set of subbands associated with the CLI measurement, the subband configuration component 725 may be configured as or otherwise support a means for receiving an indication of a bitmap associated with the set of multiple subbands that are configured for the first network entity, where the bitmap indicates the set of subbands from the set of multiple subbands, and where the measurement report includes each of the set of interference metrics associated with the set of subbands in accordance with the set of subbands being indicated by the bitmap.

In some examples, to support transmitting the measurement report, the measurement reporting component 735 may be configured as or otherwise support a means for transmitting an indication of an averaged interference metric, where the averaged interference metric is associated with an average of the set of interference metrics associated with the set of subbands, and where the measurement report is a wideband measurement report.

In some examples, the measurement reporting component 735 may be configured as or otherwise support a means for receiving an indication of a reporting setting associated with the measurement report, where the reporting setting includes one of periodic reporting, event-triggered reporting, or aperiodic reporting, where the event-triggered reporting and the aperiodic reporting are associated with an interference metric threshold.

In some examples, the measurement reporting component 735 may be configured as or otherwise support a means for including the at least one or more interference metrics in the measurement report in accordance with an interference metric threshold. In some examples, the measurement reporting component 735 may be configured as or otherwise support a means for including one or more subband identifiers associated with the one or more subbands in the measurement report.

In some examples, the interference measurement component 730 may be configured as or otherwise support a means for receiving an indication of the interference metric threshold.

In some examples, the at least one or more interference metrics and the one or more subband identifiers are included in the measurement report in accordance with each of the at least one or more interference metrics being equal to or greater than the interference metric threshold.

In some examples, the at least one or more interference metrics and the one or more subband identifiers are included in the measurement report in accordance with each of the at least one or more interference metrics being less than the interference metric threshold.

In some examples, the at least one or more interference metrics include a single interference metric and the one or more subband identifiers include a single subband identifier associated with a subband corresponding to the single interference metric. In some examples, the single interference metric and the single subband identifier are included in the measurement report in accordance with the single interference metric being either a greatest interference metric or a smallest interference metric relative to a subset of interference metrics that are less than the interference metric threshold.

In some examples, the measurement reporting component 735 may be configured as or otherwise support a means for including, in the measurement report, a set of indicators associated with the set of subbands, where a respective indicator of the set of indicators corresponds to a respective subband of the set of subbands, and where the set of indicators indicate for which subbands of the set of multiple subbands a corresponding interference metric is less than or greater than an interference metric threshold.

In some examples, the measurement reporting component 735 may be configured as or otherwise support a means for receiving an indication of a quantity of subbands for which the first network entity is to report interference metrics. In some examples, the measurement reporting component 735 may be configured as or otherwise support a means for including, in the measurement report, the at least one or more interference metrics associated with the one or more subbands, where a quantity of the one or more subbands is equal to the quantity of subbands for which the first network entity is to report interference metrics.

In some examples, the at least one or more interference metrics include either a set of largest interference metrics or a set of smallest interference metrics relative to the set of interference metrics.

In some examples, the measurement reporting component 735 may be configured as or otherwise support a means for including, in the measurement report, an absolute indication for one interference metric of the at least one or more interference metrics and a set of differential indications, relative to the absolute indication, for a remainder of the at least one or more interference metrics.

In some examples, the measurement reporting component 735 may be configured as or otherwise support a means for receiving an indication of a quantity of interference metrics for which the first network entity is to report differential indications, where a quantity of the remainder of the at least one or more interference metrics is equal to the quantity of interference metrics for which the first network entity is to report differential indications.

In some examples, the one interference metric is either a greatest interference metric or a smallest interference metric relative to the remainder of the at least one or more interference metrics. In some examples, the set of differential indications are associated with either negative delta values relative to the greatest interference metric or positive delta values relative to the smallest interference metric.

In some examples, the at least one or more interference metrics are included in the measurement report in accordance with each of the at least one or more interference metrics being equal to or greater than an interference metric threshold. In some examples, the one interference metric is the greatest interference metric relative to the remainder of the at least one or more interference metrics.

In some examples, the at least one or more interference metrics are included in the measurement report in accordance with each of the at least one or more interference metrics being less than an interference metric threshold. In some examples, the one interference metric is the smallest interference metric relative to the remainder of the at least one or more interference metrics.

In some examples, the measurement report includes an indication of each of the at least one or more interference metrics associated with the one or more subbands, wherein the one or more subbands include one or more uplink subbands, one or more downlink subbands, one or more portions of an uplink subband, or one or more portions of a downlink subband, or any combination thereof. In some examples, a first interference metric associated with an uplink subband may be associated with an inter-subband leakage interference measured with an interference metric of RSSI or SINR and a second interference metric associated with a downlink subband may be associated with an intra-subband interference that affects a receiver dynamic range or a receiver AGC blocking measured with an interference metric of RSRP or RSSI.

In some examples, the first network entity and the second network entity each support a dynamic time-division duplexing communication scheme or a full-duplex communication scheme.

Additionally, or alternatively, the communications manager 720 may support wireless communication in accordance with examples as disclosed herein. In some examples, the subband configuration component 725 may be configured as or otherwise support a means for transmitting, to a first network entity from a second network entity, an indication of a set of subbands associated with a CLI measurement at the first network entity, where the set of subbands is indicated from a set of multiple subbands configured for the first network entity, and where the CLI measurement is associated with interference between the first network entity and the second network entity. The reference signal transmission component 740 may be configured as or otherwise support a means for transmitting a set of one or more reference signals via the set of subbands in accordance with transmitting the indication of the set of subbands. In some examples, the measurement reporting component 735 may be configured as or otherwise support a means for receiving, at the second network entity from the first network entity, a measurement report associated with at least one or more interference metrics of a set of interference metrics, where the at least one or more interference metrics are associated with one or more subbands of the set of subbands.

In some examples, the SBFD operation component 745 may be configured as or otherwise support a means for transmitting, from the second network entity to the first network entity, information associated with a subband configuration for network-side subband full-duplex operation, where the subband configuration is associated with a guard band between an uplink subband and a downlink subband, and where a size of the guard band is based on the measurement report.

In some examples, to support transmitting the indication of the set of subbands associated with the CLI measurement, the subband configuration component 725 may be configured as or otherwise support a means for transmitting information associated with a respective set of resource blocks associated with each subband of the set of subbands, where the information includes one or more of a respective starting resource block index, a respective quantity of resource blocks, and a respective ending resource block index for each subband of the set of subbands.

In some examples, to support transmitting the indication of the set of subbands associated with the CLI measurement, the subband configuration component 725 may be configured as or otherwise support a means for transmitting an indication of a bitmap associated with the set of multiple subbands that are configured for the first network entity, where the bitmap indicates the set of subbands from the set of multiple subbands, and where the measurement report includes each of the set of interference metrics associated with the set of subbands in accordance with the set of subbands being indicated by the bitmap.

In some examples, to support receiving the measurement report, the measurement reporting component 735 may be configured as or otherwise support a means for receiving an indication of an averaged interference metric, where the averaged interference metric is associated with an average of the set of interference metrics, where the set of interference metrics are associated with the set of subbands, and where the measurement report is a wideband measurement report.

In some examples, the measurement reporting component 735 may be configured as or otherwise support a means for transmitting an indication of a reporting setting associated with the measurement report, where the reporting setting includes one of periodic reporting, event-triggered reporting, or aperiodic reporting, where the event-triggered reporting and the aperiodic reporting are associated with an interference metric threshold.

In some examples, the measurement report includes the at least one or more interference metrics in accordance with an interference metric threshold and includes one or more subband identifiers associated with the one or more subbands.

In some examples, the interference measurement component 730 may be configured as or otherwise support a means for transmitting, from the second network entity to the first network entity, an indication of the interference metric threshold.

In some examples, the at least one or more interference metrics and the one or more subband identifiers are included in the measurement report in accordance with each of the at least one or more interference metrics being equal to or greater than the interference metric threshold.

In some examples, the at least one or more interference metrics and the one or more subband identifiers are included in the measurement report in accordance with each of the at least one or more interference metrics being less than the interference metric threshold.

In some examples, the at least one or more interference metrics include a single interference metric and the one or more subband identifiers include a single subband identifier associated with a subband corresponding to the single interference metric. In some examples, the single interference metric and the single subband identifier are included in the measurement report in accordance with the single interference metric being either a greatest interference metric or a smallest interference metric relative to a subset of interference metrics that are less than the interference metric threshold.

In some examples, the measurement report includes a set of indicators associated with the set of subbands. In some examples, a respective indicator of the set of indicators corresponds to a respective subband of the set of subbands. In some examples, the set of indicators indicate for which subbands of the set of multiple subbands a corresponding interference metric is less than or greater than an interference metric threshold.

In some examples, the measurement reporting component 735 may be configured as or otherwise support a means for transmitting, from the second network entity to the first network entity, an indication of a quantity of subbands for which the first network entity is to report interference metrics, where the measurement report includes the at least one or more interference metrics associated with the one or more subbands, and where a quantity of the one or more subbands is equal to the quantity of subbands for which the first network entity is to report interference metrics.

In some examples, the at least one or more interference metrics include either a set of largest interference metrics or a set of smallest interference metrics relative to the set of interference metrics.

In some examples, the measurement report includes an absolute indication for one interference metric of the at least one or more interference metrics and a set of differential indications, relative to the absolute indication, for a remainder of the at least one or more interference metrics.

In some examples, the measurement reporting component 735 may be configured as or otherwise support a means for transmitting, from the second network entity to the first network entity, an indication of a quantity of interference metrics for which the first network entity is to report differential indications, where a quantity of the remainder of the at least one or more interference metrics is equal to the quantity of interference metrics for which the first network entity is to report differential indications.

In some examples, the one interference metric is either a greatest interference metric or a smallest interference metric relative to the remainder of the at least one or more interference metrics. In some examples, the set of differential indications are associated with either negative delta values relative to the greatest interference metric or positive delta values relative to the smallest interference metric.

In some examples, the at least one or more interference metrics are included in the measurement report in accordance with each of the at least one or more interference metrics being equal to or greater than an interference metric threshold. In some examples, the one interference metric is the greatest interference metric relative to the remainder of the at least one or more interference metrics.

In some examples, the at least one or more interference metrics are included in the measurement report in accordance with each of the at least one or more interference metrics being less than an interference metric threshold. In some examples, the one interference metric is the smallest interference metric relative to the remainder of the at least one or more interference metrics.

In some examples, the measurement report includes an indication of each of the at least one or more interference metrics associated with the one or more subbands, wherein the one or more subbands include one or more uplink subbands, one or more downlink subbands, one or more portions of an uplink subband, or one or more portions of a downlink subband, or any combination thereof. In some examples, a first interference metric associated with an uplink subband may be associated with an inter-subband leakage interference measured with an interference metric of RSSI or SINR and a second interference metric associated with a downlink subband may be associated with an intra-subband interference that affects a receiver dynamic range or a receiver AGC blocking measured with an interference metric of RSRP or RSSI.

In some examples, the first network entity and the second network entity each support a dynamic time-division duplexing communication scheme or a full-duplex communication scheme.

Figure 8:
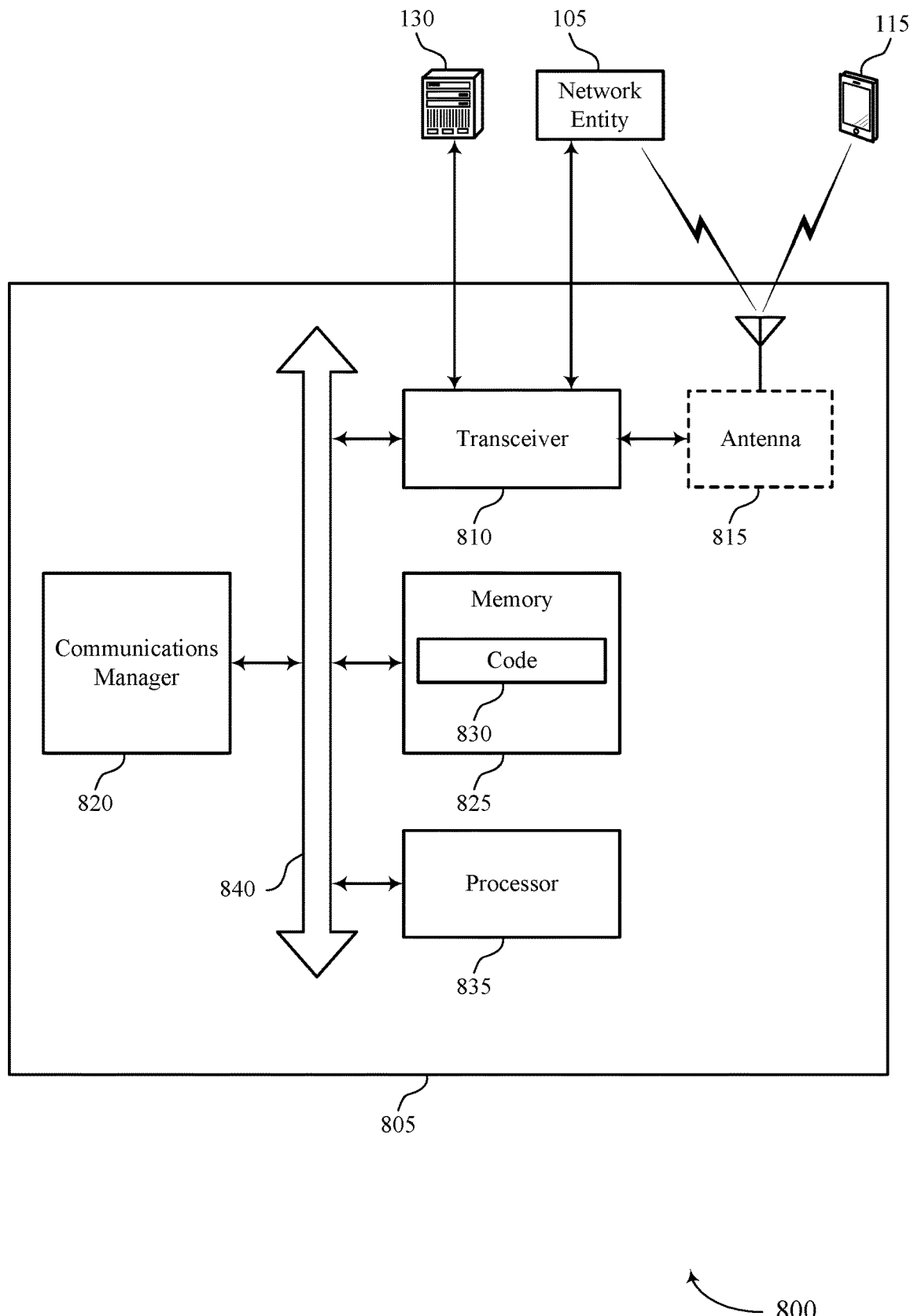
FIG. 8 illustrates a diagram of a system including a device that supports inter-network entity subband-based CLI measurement and reporting in accordance with one or more aspects of the present disclosure.

FIG. 8 illustrates a diagram of a system 800 including a device 805 that supports inter-network entity subband-based CLI measurement and reporting in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting inter-network entity subband-based CLI measurement and reporting). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825).

In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805.

The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communication at a first network entity in accordance with examples as disclosed herein. For example, the communications manager 820 may be configured as or otherwise support a means for receiving an indication of a set of subbands associated with a CLI measurement at the first network entity, where the set of subbands is indicated from a set of multiple subbands configured for the first network entity, and where the CLI measurement is associated with interference between the first network entity and a second network entity. The communications manager 820 may be configured as or otherwise support a means for measuring a set of interference metrics associated with the set of subbands in accordance with receiving the indication of the set of subbands, where a respective interference metric of the set of interference metrics is associated with a respective subband of the set of subbands. The communications manager 820 may be configured as or otherwise support a means for transmitting a measurement report associated with at least one or more interference metrics of the set of interference metrics, where the at least one or more interference metrics are associated with one or more subbands of the set of subbands.

Additionally, or alternatively, the communications manager 820 may support wireless communication in accordance with examples as disclosed herein. For example, the communications manager 820 may be configured as or otherwise support a means for transmitting, to a first network entity from a second network entity, an indication of a set of subbands associated with a CLI measurement at the first network entity, where the set of subbands is indicated from a set of multiple subbands configured for the first network entity, and where the CLI measurement is associated with interference between the first network entity and the second network entity. The communications manager 820 may be configured as or otherwise support a means for transmitting a set of one or more reference signals via the set of subbands in accordance with transmitting the indication of the set of subbands. The communications manager 820 may be configured as or otherwise support a means for receiving, at the second network entity from the first network entity, a measurement report associated with at least one or more interference metrics of a set of interference metrics, where the at least one or more interference metrics are associated with one or more subbands of the set of subbands.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of inter-network entity subband-based CLI measurement and reporting as described herein, or the processor 835 and the memory 825 may be otherwise configured to perform or support such operations.

Figure 9:
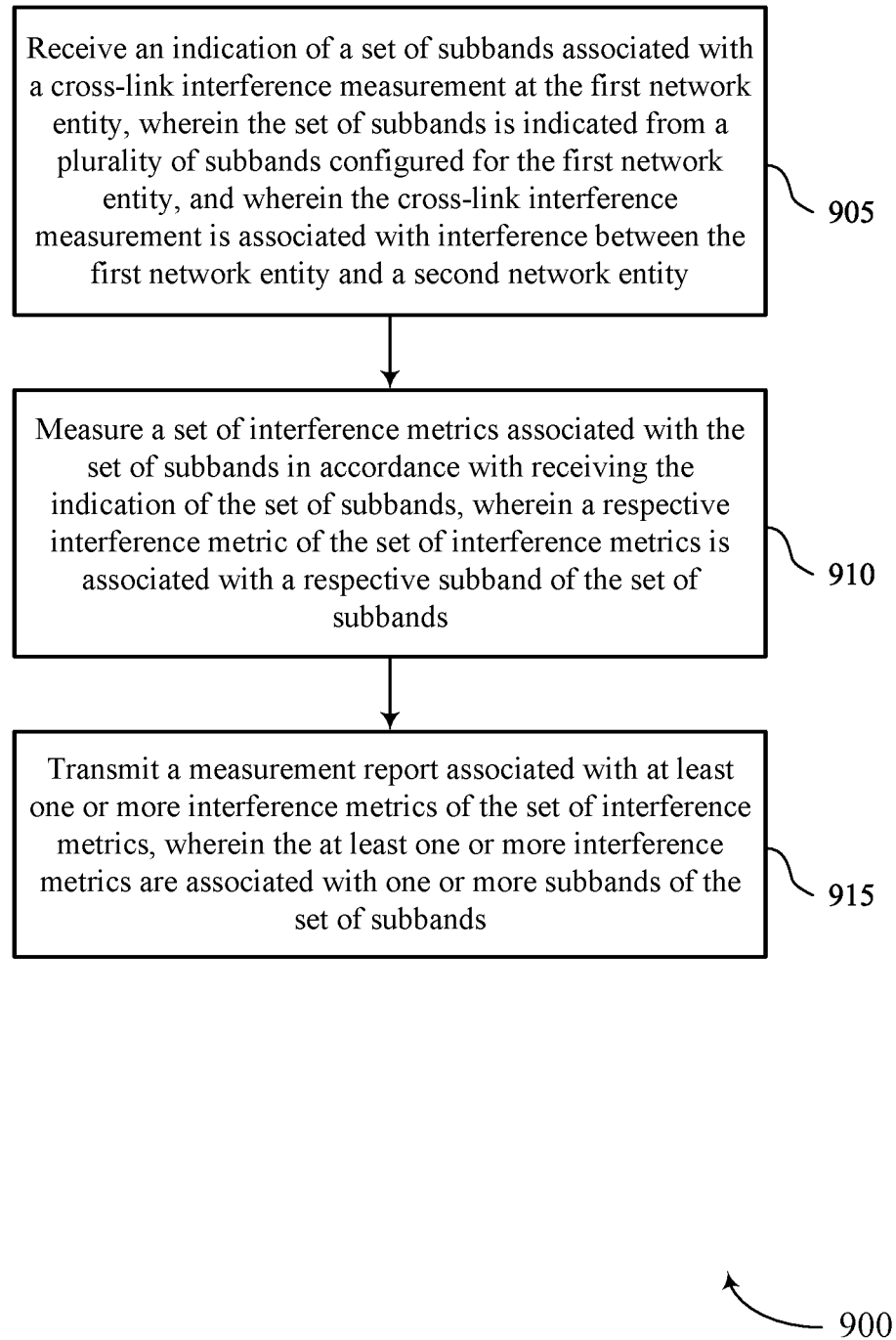
FIGS. 9 and 10 illustrate flowcharts showing methods that support inter-network entity subband-based CLI measurement and reporting in accordance with one or more aspects of the present disclosure.

FIG. 9 illustrates a flowchart illustrating a method 900 that supports inter-network entity subband-based CLI measurement and reporting in accordance with one or more aspects of the present disclosure. The operations of the method 900 may be implemented by a network entity or its components as described herein. For example, the operations of the method 900 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 905, the method may include receiving an indication of a set of subbands associated with a cross-link interference measurement at the first network entity, wherein the set of subbands is indicated from a plurality of subbands configured for the first network entity, and wherein the cross-link interference measurement is associated with interference between the first network entity and a second network entity. The operations of 905 may be performed in accordance with examples as disclosed herein. In some examples, aspects of the operations of 905 may be performed by a subband configuration component 725 as described with reference to FIG. 7.

At 910, the method may include measuring a set of interference metrics associated with the set of subbands in accordance with receiving the indication of the set of subbands, wherein a respective interference metric of the set of interference metrics is associated with a respective subband of the set of subbands. The operations of 910 may be performed in accordance with examples as disclosed herein. In some examples, aspects of the operations of 910 may be performed by an interference measurement component 730 as described with reference to FIG. 7.

At 915, the method may include transmitting a measurement report associated with at least one or more interference metrics of the set of interference metrics, wherein the at least one or more interference metrics are associated with one or more subbands of the set of subbands. The operations of 915 may be performed in accordance with examples as disclosed herein. In some examples, aspects of the operations of 915 may be performed by a measurement reporting component 735 as described with reference to FIG. 7.

Figure 10:
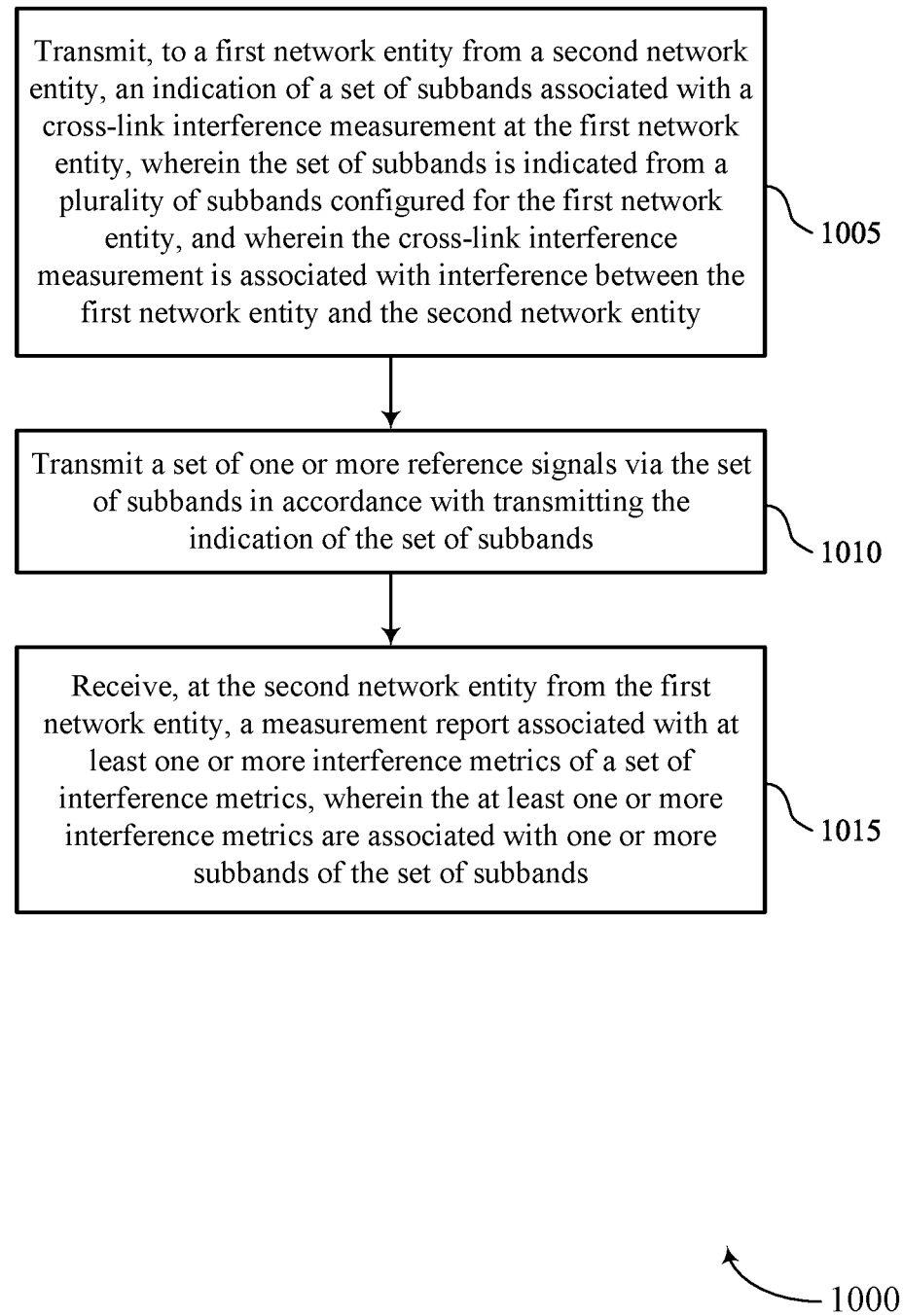

FIG. 10 illustrates a flowchart illustrating a method 1000 that supports inter-network entity subband-based CLI measurement and reporting in accordance with one or more aspects of the present disclosure. The operations of the method 1000 may be implemented by a network entity or its components as described herein. For example, the operations of the method 1000 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1005, the method may include transmitting, to a first network entity from a second network entity, an indication of a set of subbands associated with a cross-link interference measurement at the first network entity, wherein the set of subbands is indicated from a plurality of subbands configured for the first network entity, and wherein the cross-link interference measurement is associated with interference between the first network entity and the second network entity. The operations of 1005 may be performed in accordance with examples as disclosed herein. In some examples, aspects of the operations of 1005 may be performed by a subband configuration component 725 as described with reference to FIG. 7.

At 1010, the method may include transmitting a set of one or more reference signals via the set of subbands in accordance with transmitting the indication of the set of subbands. The operations of 1010 may be performed in accordance with examples as disclosed herein. In some examples, aspects of the operations of 1010 may be performed by a reference signal transmission component 740 as described with reference to FIG. 7.

At 1015, the method may include receiving, at the second network entity from the first network entity, a measurement report associated with at least one or more interference metrics of a set of interference metrics, wherein the at least one or more interference metrics are associated with one or more subbands of the set of subbands. The operations of 1015 may be performed in accordance with examples as disclosed herein. In some examples, aspects of the operations of 1015 may be performed by a measurement reporting component 735 as described with reference to FIG. 7.

The following provides an overview of aspects of the present disclosure:

Aspect 1: A method for wireless communication at a first network entity, comprising: receiving an indication of a set of subbands associated with a CLI measurement at the first network entity, wherein the set of subbands is indicated from a plurality of subbands configured for the first network entity, and wherein the CLI measurement is associated with interference between the first network entity and a second network entity; measuring a set of interference metrics associated with the set of subbands in accordance with receiving the indication of the set of subbands, wherein a respective interference metric of the set of interference metrics is associated with a respective subband of the set of subbands; and transmitting a measurement report associated with at least one or more interference metrics of the set of interference metrics, wherein the at least one or more interference metrics are associated with one or more subbands of the set of subbands.

Aspect 2: The method of aspect 1, further comprising: receiving information associated with a subband configuration, wherein the subband configuration is associated with a guard band between an uplink subband and a downlink subband, and wherein a size of the guard band is based at least in part on the measurement report; and communicating with a UE in accordance with the subband configuration for network-side subband full-duplex operation.

Aspect 3: The method of any of aspects 1 through 2, wherein receiving the indication of the set of subbands associated with the CLI measurement comprises: receiving information associated with a respective set of resource blocks associated with each subband of the set of subbands, wherein the information includes one or more of a respective starting resource block index, a respective quantity of resource blocks, and a respective ending resource block index for each subband of the set of subbands.

Aspect 4: The method of any of aspects 1 through 3, wherein receiving the indication of the set of subbands associated with the CLI measurement comprises: receiving an indication of a bitmap associated with the plurality of subbands that are configured for the first network entity, wherein the bitmap indicates the set of subbands from the plurality of subbands, and wherein the measurement report includes each of the set of interference metrics associated with the set of subbands in accordance with the set of subbands being indicated by the bitmap.

Aspect 5: The method of any of aspects 1 through 4, wherein transmitting the measurement report comprises: transmitting an indication of an averaged interference metric, wherein the averaged interference metric is associated with an average of the set of interference metrics associated with the set of subbands, and wherein the measurement report is a wideband measurement report.

Aspect 6: The method of any of aspects 1 through 5, further comprising: receiving an indication of a reporting setting associated with the measurement report, wherein the reporting setting includes one of periodic reporting, event-triggered reporting, or aperiodic reporting, wherein the event-triggered reporting and the aperiodic reporting are associated with an interference metric threshold.

Aspect 7: The method of any of aspects 1 through 6, further comprising: including the at least one or more interference metrics in the measurement report in accordance with an interference metric threshold; and including one or more subband identifiers associated with the one or more subbands in the measurement report.

Aspect 8: The method of aspect 7, further comprising: receiving an indication of the interference metric threshold.

Aspect 9: The method of any of aspects 7 through 8, wherein the at least one or more interference metrics and the one or more subband identifiers are included in the measurement report in accordance with each of the at least one or more interference metrics being equal to or greater than the interference metric threshold.

Aspect 10: The method of any of aspects 7 through 8, wherein the at least one or more interference metrics and the one or more subband identifiers are included in the measurement report in accordance with each of the at least one or more interference metrics being less than the interference metric threshold.

Aspect 11: The method of any of aspects 7 through 8, wherein the at least one or more interference metrics include a single interference metric and the one or more subband identifiers include a single subband identifier associated with a subband corresponding to the single interference metric, and the single interference metric and the single subband identifier are included in the measurement report in accordance with the single interference metric being either a greatest interference metric or a smallest interference metric relative to a subset of interference metrics that are less than the interference metric threshold.

Aspect 12: The method of any of aspects 1 through 11, further comprising: including, in the measurement report, a set of indicators associated with the set of subbands, wherein a respective indicator of the set of indicators corresponds to a respective subband of the set of subbands, and wherein the set of indicators indicate for which subbands of the plurality of subbands a corresponding interference metric is less than or greater than an interference metric threshold.

Aspect 13: The method of any of aspects 1 through 12, further comprising: receiving an indication of a quantity of subbands for which the first network entity is to report interference metrics; and including, in the measurement report, the at least one or more interference metrics associated with the one or more subbands, wherein a quantity of the one or more subbands is equal to the quantity of subbands for which the first network entity is to report interference metrics.

Aspect 14: The method of aspect 13, wherein the at least one or more interference metrics include either a set of largest interference metrics or a set of smallest interference metrics relative to the set of interference metrics.

Aspect 15: The method of any of aspects 1 through 14, further comprising: including, in the measurement report, an absolute indication for one interference metric of the at least one or more interference metrics and a set of differential indications, relative to the absolute indication, for a remainder of the at least one or more interference metrics.

Aspect 16: The method of aspect 15, further comprising: receiving an indication of a quantity of interference metrics for which the first network entity is to report differential indications, wherein a quantity of the remainder of the at least one or more interference metrics is equal to the quantity of interference metrics for which the first network entity is to report differential indications.

Aspect 17: The method of any of aspects 15 through 16, wherein the one interference metric is either a greatest interference metric or a smallest interference metric relative to the remainder of the at least one or more interference metrics, and the set of differential indications are associated with either negative delta values relative to the greatest interference metric or positive delta values relative to the smallest interference metric.

Aspect 18: The method of aspect 17, wherein the at least one or more interference metrics are included in the measurement report in accordance with each of the at least one or more interference metrics being equal to or greater than an interference metric threshold, and the one interference metric is the greatest interference metric relative to the remainder of the at least one or more interference metrics.

Aspect 19: The method of any of aspects 17, wherein the at least one or more interference metrics are included in the measurement report in accordance with each of the at least one or more interference metrics being less than an interference metric threshold, and the one interference metric is the smallest interference metric relative to the remainder of the at least one or more interference metrics.

Aspect 20: The method of any of aspects 1 through 19, wherein the measurement report includes an indication of each of the at least one or more interference metrics associated with the one or more subbands, wherein the one or more subbands include one or more uplink subbands, one or more downlink subbands, one or more portions of an uplink subband, or one or more portions of a downlink subband, or any combination thereof, and wherein a first interference metric associated with an uplink subband is associated with an inter-subband leakage interference measured with an interference metric of RSSI or SINR and a second interference metric associated with a downlink subband is associated with an intra-subband interference that affects a receiver dynamic range or a receiver AGC blocking measured with an interference metric of RSRP or RSSI.

Aspect 21: The method of any of aspects 1 through 20, wherein the first network entity and the second network entity each support a dynamic time-division duplexing communication scheme or a full-duplex communication scheme.

Aspect 22: A method for wireless communication, comprising: transmitting, to a first network entity from a second network entity, an indication of a set of subbands associated with a CLI measurement at the first network entity, wherein the set of subbands is indicated from a plurality of subbands configured for the first network entity, and wherein the CLI measurement is associated with interference between the first network entity and the second network entity; transmitting a set of one or more reference signals via the set of subbands in accordance with transmitting the indication of the set of subbands; and receiving, at the second network entity from the first network entity, a measurement report associated with at least one or more interference metrics of a set of interference metrics, wherein the at least one or more interference metrics are associated with one or more subbands of the set of subbands.

Aspect 23: The method of aspect 22, further comprising: transmitting, from the second network entity to the first network entity, information associated with a subband configuration for network-side subband full-duplex operation, wherein the subband configuration is associated with a guard band between an uplink subband and a downlink subband, and wherein a size of the guard band is based at least in part on the measurement report.

Aspect 24: The method of any of aspects 22 through 23, wherein transmitting the indication of the set of subbands associated with the CLI measurement comprises: transmitting information associated with a respective set of resource blocks associated with each subband of the set of subbands, wherein the information includes one or more of a respective starting resource block index, a respective quantity of resource blocks, and a respective ending resource block index for each subband of the set of subbands.

Aspect 25: The method of any of aspects 22 through 24, wherein transmitting the indication of the set of subbands associated with the CLI measurement comprises: transmitting an indication of a bitmap associated with the plurality of subbands that are configured for the first network entity, wherein the bitmap indicates the set of subbands from the plurality of subbands, and wherein the measurement report includes each of the set of interference metrics associated with the set of subbands in accordance with the set of subbands being indicated by the bitmap.

Aspect 26: The method of any of aspects 22 through 25, wherein receiving the measurement report comprises: receiving an indication of an averaged interference metric, wherein the averaged interference metric is associated with an average of the set of interference metrics, wherein the set of interference metrics are associated with the set of subbands, and wherein the measurement report is a wideband measurement report.

Aspect 27: The method of any of aspects 22 through 26, further comprising: transmitting an indication of a reporting setting associated with the measurement report, wherein the reporting setting includes one of periodic reporting, event-triggered reporting, or aperiodic reporting, wherein the event-triggered reporting and the aperiodic reporting are associated with an interference metric threshold.

Aspect 28: The method of any of aspects 22 through 27, wherein the measurement report includes the at least one or more interference metrics in accordance with an interference metric threshold and includes one or more subband identifiers associated with the one or more subbands.

Aspect 29: The method of aspect 28, further comprising: transmitting, from the second network entity to the first network entity, an indication of the interference metric threshold.

Aspect 30: The method of any of aspects 28 through 29, wherein the at least one or more interference metrics and the one or more subband identifiers are included in the measurement report in accordance with each of the at least one or more interference metrics being equal to or greater than the interference metric threshold.

Aspect 31: The method of any of aspects 28 through 29, wherein the at least one or more interference metrics and the one or more subband identifiers are included in the measurement report in accordance with each of the at least one or more interference metrics being less than the interference metric threshold.

Aspect 32: The method of any of aspects 28 through 29, wherein the at least one or more interference metrics include a single interference metric and the one or more subband identifiers include a single subband identifier associated with a subband corresponding to the single interference metric, and the single interference metric and the single subband identifier are included in the measurement report in accordance with the single interference metric being either a greatest interference metric or a smallest interference metric relative to a subset of interference metrics that are less than the interference metric threshold.

Aspect 33: The method of any of aspects 22 through 32, wherein the measurement report includes a set of indicators associated with the set of subbands, a respective indicator of the set of indicators corresponds to a respective subband of the set of subbands, and the set of indicators indicate for which subbands of the plurality of subbands a corresponding interference metric is less than or greater than an interference metric threshold.

Aspect 34: The method of any of aspects 22 through 33, further comprising: transmitting, from the second network entity to the first network entity, an indication of a quantity of subbands for which the first network entity is to report interference metrics, wherein the measurement report includes the at least one or more interference metrics associated with the one or more subbands, and wherein a quantity of the one or more subbands is equal to the quantity of subbands for which the first network entity is to report interference metrics.

Aspect 35: The method of aspect 34, wherein the at least one or more interference metrics include either a set of largest interference metrics or a set of smallest interference metrics relative to the set of interference metrics.

Aspect 36: The method of any of aspects 22 through 35, wherein the measurement report includes an absolute indication for one interference metric of the at least one or more interference metrics and a set of differential indications, relative to the absolute indication, for a remainder of the at least one or more interference metrics.

Aspect 37: The method of aspect 36, further comprising: transmitting, from the second network entity to the first network entity, an indication of a quantity of interference metrics for which the first network entity is to report differential indications, wherein a quantity of the remainder of the at least one or more interference metrics is equal to the quantity of interference metrics for which the first network entity is to report differential indications.

Aspect 38: The method of any of aspects 36 through 37, wherein the one interference metric is either a greatest interference metric or a smallest interference metric relative to the remainder of the at least one or more interference metrics, and the set of differential indications are associated with either negative delta values relative to the greatest interference metric or positive delta values relative to the smallest interference metric.

Aspect 39: The method of aspect 38, wherein the at least one or more interference metrics are included in the measurement report in accordance with each of the at least one or more interference metrics being equal to or greater than an interference metric threshold, and the one interference metric is the greatest interference metric relative to the remainder of the at least one or more interference metrics.

Aspect 40: The method of any of aspects 38, wherein the at least one or more interference metrics are included in the measurement report in accordance with each of the at least one or more interference metrics being less than an interference metric threshold, and the one interference metric is the smallest interference metric relative to the remainder of the at least one or more interference metrics.

Aspect 41: The method of any of aspects 22 through 40, wherein the measurement report includes an indication of each of the at least one or more interference metrics associated with the one or more subbands, wherein the one or more subbands include one or more uplink subbands, one or more downlink subbands, one or more portions of an uplink subband, or one or more portions of a downlink subband, or any combination thereof, and wherein a first interference metric associated with an uplink subband is associated with an inter-subband leakage interference measured with an interference metric of RSSI or SINR and a second interference metric associated with a downlink subband is associated with an intra-subband interference that affects a receiver dynamic range or a receiver AGC blocking measured with an interference metric of RSRP or RSSI.

Aspect 42: The method of any of aspects 22 through 41, wherein the first network entity and the second network entity each support a dynamic time-division duplexing communication scheme or a full-duplex communication scheme.

Aspect 43: An apparatus for wireless communication at a first network entity, comprising at least one processor; and memory coupled (e.g., operatively, communicatively, functionally, electronically, or electrically) with the at least one processor, the memory storing instructions executable by the at least one processor to cause the first network entity to perform a method of any of aspects 1 through 21.

Aspect 44: An apparatus for wireless communication at a first network entity, comprising at least one means for performing a method of any of aspects 1 through 21.

Aspect 45: A non-transitory computer-readable medium storing code for wireless communication, the code comprising instructions executable by at least one processor to perform a method of any of aspects 1 through 21.

Aspect 46: An apparatus for wireless communication, comprising at least one processor; and memory coupled (e.g., operatively, communicatively, functionally, electronically, or electrically) with the at least one processor, the memory storing instructions executable by the at least one processor to cause a second network entity to perform a method of any of aspects 22 through 42.

Aspect 47: An apparatus for wireless communication, comprising at least one means for performing a method of any of aspects 22 through 42.

Aspect 48: A non-transitory computer-readable medium storing code for wireless communication, the code comprising instructions executable by at least one processor to perform a method of any of aspects 22 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first network entity, comprising:
    at least one processor; and
    memory coupled with the at least one processor, the memory storing instructions executable by the at least one processor to cause the first network entity to:
        receive an indication of a set of subbands associated with a cross-link interference measurement at the first network entity, wherein the set of subbands is indicated from a plurality of subbands configured for the first network entity, and wherein the cross-link interference measurement is associated with interference between the first network entity and a second network entity;
        measure a set of interference metrics associated with the set of subbands in accordance with receiving the indication of the set of subbands, wherein a respective interference metric of the set of interference metrics is associated with a respective subband of the set of subbands; and
        transmit a measurement report associated with at least one or more interference metrics of the set of interference metrics, wherein the at least one or more interference metrics are associated with one or more subbands of the set of subbands.

2. The apparatus of claim 1, wherein the instructions are further executable by the at least one processor to cause the first network entity to:
    receive information associated with a subband configuration, wherein the subband configuration is associated with a guard band between an uplink subband and a downlink subband, and wherein a size of the guard band is based at least in part on the measurement report; and
    communicate with a user equipment (UE) in accordance with the subband configuration for network-side subband full-duplex operation.

3. The apparatus of claim 1, wherein the instructions to receive the indication of the set of subbands associated with the cross-link interference measurement are executable by the at least one processor to cause the first network entity to:
    receive information associated with a respective set of resource blocks associated with each subband of the set of subbands, wherein the information includes one or more of a respective starting resource block index, a respective quantity of resource blocks, and a respective ending resource block index for each subband of the set of subbands.

4. The apparatus of claim 1, wherein the instructions to receive the indication of the set of subbands associated with the cross-link interference measurement are executable by the at least one processor to cause the first network entity to:
    receive an indication of a bitmap associated with the plurality of subbands that are configured for the first network entity, wherein the bitmap indicates the set of subbands from the plurality of subbands, and wherein the measurement report includes each of the set of interference metrics associated with the set of subbands in accordance with the set of subbands being indicated by the bitmap.

5. The apparatus of claim 1, wherein the instructions to transmit the measurement report are executable by the at least one processor to cause the first network entity to:
    transmit an indication of an averaged interference metric, wherein the averaged interference metric is associated with an average of the set of interference metrics associated with the set of subbands, and wherein the measurement report is a wideband measurement report.

6. The apparatus of claim 1, wherein the instructions are further executable by the at least one processor to cause the first network entity to:
receive an indication of a reporting setting associated with the measurement report, wherein the reporting setting includes one of periodic reporting, event-triggered reporting, or aperiodic reporting, wherein the event-triggered reporting and the aperiodic reporting are associated with an interference metric threshold.

7. The apparatus of claim 1, wherein the instructions are further executable by the at least one processor to cause the first network entity to:
include the at least one or more interference metrics in the measurement report in accordance with an interference metric threshold; and
include one or more subband identifiers associated with the one or more subbands in the measurement report.

8. The apparatus of claim 7, wherein the instructions are further executable by the at least one processor to cause the first network entity to:
receive an indication of the interference metric threshold.

9. The apparatus of claim 7, wherein the at least one or more interference metrics and the one or more subband identifiers are included in the measurement report in accordance with each of the at least one or more interference metrics being equal to or greater than the interference metric threshold.

10. The apparatus of claim 7, wherein the at least one or more interference metrics and the one or more subband identifiers are included in the measurement report in accordance with each of the at least one or more interference metrics being less than the interference metric threshold.

11. The apparatus of claim 7, wherein the at least one or more interference metrics include a single interference metric and the one or more subband identifiers include a single subband identifier associated with a subband corresponding to the single interference metric, and wherein the single interference metric and the single subband identifier are included in the measurement report in accordance with the single interference metric being either a greatest interference metric or a smallest interference metric relative to a subset of interference metrics that are less than the interference metric threshold.

12. The apparatus of claim 1, wherein the instructions are further executable by the at least one processor to cause the first network entity to:
include, in the measurement report, a set of indicators associated with the set of subbands, wherein a respective indicator of the set of indicators corresponds to a respective subband of the set of subbands, and wherein the set of indicators indicate for which subbands of the plurality of subbands a corresponding interference metric is less than or greater than an interference metric threshold.

13. The apparatus of claim 1, wherein the instructions are further executable by the at least one processor to cause the first network entity to:
receive an indication of a quantity of subbands for which the first network entity is to report interference metrics; and
include, in the measurement report, the at least one or more interference metrics associated with the one or more subbands, wherein a quantity of the one or more subbands is equal to the quantity of subbands for which the first network entity is to report interference metrics.

14. The apparatus of claim 13, wherein the at least one or more interference metrics include either a set of largest interference metrics or a set of smallest interference metrics relative to the set of interference metrics.

15. The apparatus of claim 1, wherein the instructions are further executable by the at least one processor to cause the first network entity to:
include, in the measurement report, an absolute indication for one interference metric of the at least one or more interference metrics and a set of differential indications, relative to the absolute indication, for a remainder of the at least one or more interference metrics.

16. The apparatus of claim 15, wherein the instructions are further executable by the at least one processor to cause the first network entity to:
receive an indication of a quantity of interference metrics for which the first network entity is to report differential indications, wherein a quantity of the remainder of the at least one or more interference metrics is equal to the quantity of interference metrics for which the first network entity is to report differential indications.

17. The apparatus of claim 15, wherein the one interference metric is either a greatest interference metric or a smallest interference metric relative to the remainder of the at least one or more interference metrics, and wherein the set of differential indications are associated with either negative delta values relative to the greatest interference metric or positive delta values relative to the smallest interference metric.

18. The apparatus of claim 17, wherein the at least one or more interference metrics are included in the measurement report in accordance with each of the at least one or more interference metrics being equal to or greater than an interference metric threshold, and wherein the one interference metric is the greatest interference metric relative to the remainder of the at least one or more interference metrics.

19. The apparatus of claim 17, wherein the at least one or more interference metrics are included in the measurement report in accordance with each of the at least one or more interference metrics being less than an interference metric threshold, and wherein the one interference metric is the smallest interference metric relative to the remainder of the at least one or more interference metrics.

20. The apparatus of claim 1, wherein the measurement report includes an indication of each of the at least one or more interference metrics associated with the one or more subbands, wherein the one or more subbands include one or more uplink subbands, one or more downlink subbands, one or more portions of an uplink subband, or one or more portions of a downlink subband, or any combination thereof, and wherein a first interference metric associated with an uplink subband is associated with an inter-subband leakage interference measured with an interference metric of received signal strength indicator or signal-to-interference-plus-noise ratio and a second interference metric associated with a downlink subband is associated with an intra-subband interference that affects a receiver dynamic range or a receiver automatic gain control blocking measured with an interference metric of reference signal received power or received signal strength indicator.

21. The apparatus of claim 1, wherein the first network entity and the second network entity each support a dynamic time-division duplexing communication scheme or a full-duplex communication scheme.

22. An apparatus for wireless communication at a second network entity, comprising:
at least one processor; and memory coupled with the at least one processor, the memory storing instructions executable by the at least one processor to cause the second network entity to:
  transmit, to a first network entity from the second network entity, an indication of a set of subbands associated with a cross-link interference measurement at the first network entity, wherein the set of subbands is indicated from a plurality of subbands configured for the first network entity, and wherein the cross-link interference measurement is associated with interference between the first network entity and the second network entity;
  transmit a set of one or more reference signals via the set of subbands in accordance with transmitting the indication of the set of subbands; and
  receive, at the second network entity from the first network entity, a measurement report associated with at least one or more interference metrics of a set of interference metrics, wherein the at least one or more interference metrics are associated with one or more subbands of the set of subbands.

23. The apparatus of claim 22, wherein the instructions are further executable by the at least one processor to cause the second network entity to:
  transmit, from the second network entity to the first network entity, information associated with a subband configuration for network-side subband full-duplex operation, wherein the subband configuration is associated with a guard band between an uplink subband and a downlink subband, and wherein a size of the guard band is based at least in part on the measurement report.

24. The apparatus of claim 22, wherein the instructions to transmit the indication of the set of subbands associated with the cross-link interference measurement are executable by the at least one processor to cause the second network entity to:
  transmit information associated with a respective set of resource blocks associated with each subband of the set of subbands, wherein the information includes one or more of a respective starting resource block index, a respective quantity of resource blocks, and a respective ending resource block index for each subband of the set of subbands.

25. The apparatus of claim 22, wherein the instructions to transmit the indication of the set of subbands associated with the cross-link interference measurement are executable by the at least one processor to cause the second network entity to:
  transmit an indication of a bitmap associated with the plurality of subbands that are configured for the first network entity, wherein the bitmap indicates the set of subbands from the plurality of subbands, and wherein the measurement report includes each of the set of interference metrics associated with the set of subbands in accordance with the set of subbands being indicated by the bitmap.

26. The apparatus of claim 22, wherein the instructions to receive the measurement report are executable by the at least one processor to cause the second network entity to:
  receive an indication of an averaged interference metric, wherein the averaged interference metric is associated with an average of the set of interference metrics, wherein the set of interference metrics are associated with the set of subbands, and wherein the measurement report is a wideband measurement report.

27. The apparatus of claim 22, wherein the instructions are further executable by the at least one processor to cause the second network entity to:
  transmit an indication of a reporting setting associated with the measurement report, wherein the reporting setting includes one of periodic reporting, event-triggered reporting, or aperiodic reporting, wherein the event-triggered reporting and the aperiodic reporting are associated with an interference metric threshold.

28. The apparatus of claim 22, wherein the measurement report includes the at least one or more interference metrics in accordance with an interference metric threshold and includes one or more subband identifiers associated with the one or more subbands.

29. A method for wireless communication at a first network entity, comprising:
  receiving an indication of a set of subbands associated with a cross-link interference measurement at the first network entity, wherein the set of subbands is indicated from a plurality of subbands configured for the first network entity, and wherein the cross-link interference measurement is associated with interference between the first network entity and a second network entity;
  measuring a set of interference metrics associated with the set of subbands in accordance with receiving the indication of the set of subbands, wherein a respective interference metric of the set of interference metrics is associated with a respective subband of the set of subbands; and
  transmitting a measurement report associated with at least one or more interference metrics of the set of interference metrics, wherein the at least one or more interference metrics are associated with one or more subbands of the set of subbands.

30. A method for wireless communication, comprising:
  transmitting, to a first network entity from a second network entity, an indication of a set of subbands associated with a cross-link interference measurement at the first network entity, wherein the set of subbands is indicated from a plurality of subbands configured for the first network entity, and wherein the cross-link interference measurement is associated with interference between the first network entity and the second network entity;
  transmitting a set of one or more reference signals via the set of subbands in accordance with transmitting the indication of the set of subbands; and
  receiving, at the second network entity from the first network entity, a measurement report associated with at least one or more interference metrics of a set of interference metrics, wherein the at least one or more interference metrics are associated with one or more subbands of the set of subbands.

* * * * *